United States Patent
Swix et al.

(10) Patent No.: US 7,802,276 B2
(45) Date of Patent: Sep. 21, 2010

(54) SYSTEMS, METHODS AND PRODUCTS FOR ASSESSING SUBSCRIBER CONTENT ACCESS

(75) Inventors: Scott R. Swix, Columbus, OH (US); Robert A. Koch, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 664 days.

(21) Appl. No.: 11/212,369

(22) Filed: Aug. 26, 2005

(65) Prior Publication Data
US 2005/0283792 A1 Dec. 22, 2005

Related U.S. Application Data

(63) Continuation-in-part of application No. 11/154,248, filed on Jun. 16, 2005, which is a continuation of application No. 09/496,825, filed on Feb. 1, 2000, now Pat. No. 6,983,478, which is a continuation of application No. 08/779,306, filed on Jan. 6, 1997, now abandoned, which is a continuation-in-part of application No. 10/017,630, filed on Dec. 14, 2001.

(51) Int. Cl.
*H04H 60/32* (2008.01)
*H04H 20/14* (2008.01)
*H04H 60/29* (2008.01)
*H04N 5/91* (2006.01)
(52) U.S. Cl. .............................. 725/14; 725/22; 386/83
(58) Field of Classification Search .................... 725/9, 725/14, 16, 21, 22; 386/83
See application file for complete search history.

(56) References Cited

U.S. PATENT DOCUMENTS

| | | | |
|---|---|---|---|
| 677,209 A | 6/1901 | Chernock et al. | |
| 3,798,610 A | 3/1974 | Bliss et al. | |
| 3,886,302 A | 5/1975 | Kosco | |
| 4,130,833 A | 12/1978 | Chomet | |
| 4,258,386 A | 3/1981 | Cheung | |
| 4,361,851 A | 11/1982 | Asip et al. | |
| 4,488,179 A | 12/1984 | Kruger et al. | |
| 4,566,030 A | 1/1986 | Nickerson et al. | |
| 4,567,591 A | 1/1986 | Gray et al. | |
| 4,598,288 A | 7/1986 | Yarbrough et al. | |
| 4,602,279 A | 7/1986 | Freeman | |
| 4,688,248 A | 8/1987 | Tomizawa | |

(Continued)

FOREIGN PATENT DOCUMENTS

EP 0 424 648 A 2/1991

(Continued)

OTHER PUBLICATIONS

U.S. Appl. No. 09/799,306, filed Jan. 6, 1997, Grauch.

(Continued)

*Primary Examiner*—Joseph G Ustaris
(74) *Attorney, Agent, or Firm*—Scott P. Zimmerman PLLC

(57) ABSTRACT

Methods, systems, and products are disclosed for reporting a subscriber's content access selections to marketers. One such method stores when content is provided to a subscriber and when that content is displayed by the subscriber. The method then reports when the content is provided and when the content is viewed, thus describing the subscriber's content selections.

20 Claims, 12 Drawing Sheets

U.S. PATENT DOCUMENTS

| | | | |
|---|---|---|---|
| 4,689,661 A | 8/1987 | Barbieri et al. | |
| 4,697,209 A | 9/1987 | Kiewitt et al. | |
| 4,698,670 A | 10/1987 | Matty | |
| 4,720,873 A | 1/1988 | Goodman et al. | |
| 4,816,904 A | 3/1989 | McKenna et al. | |
| 4,890,322 A | 12/1989 | Russell, Jr. | |
| 4,912,552 A | 3/1990 | Allison, III et al. | |
| 5,010,585 A | 4/1991 | Garcia | |
| 5,038,211 A | 8/1991 | Hallenbeck | |
| 5,046,090 A | 9/1991 | Walker et al. | |
| 5,046,092 A | 9/1991 | Walker et al. | |
| 5,055,924 A | 10/1991 | Skutta | |
| 5,173,900 A | 12/1992 | Miller et al. | |
| 5,191,645 A | 3/1993 | Carlucci et al. | |
| 5,208,665 A | 5/1993 | McCalley et al. | |
| 5,247,347 A | 9/1993 | Litteral et al. | |
| 5,249,044 A | 9/1993 | VonKohorn | |
| 5,251,324 A | 10/1993 | McMullan | |
| 5,287,181 A | 2/1994 | Holman | |
| 5,335,277 A | 8/1994 | Harvey et al. | |
| 5,339,315 A | 8/1994 | Maeda et al. | |
| 5,343,240 A | 8/1994 | Yu | |
| 5,357,276 A | 10/1994 | Banker et al. | |
| 5,374,951 A | 12/1994 | Welsh | |
| 5,382,970 A | 1/1995 | Kiefl | |
| 5,389,964 A | 2/1995 | Oberle | |
| 5,404,393 A | 4/1995 | Remillard | |
| 5,410,326 A | 4/1995 | Goldstein | |
| 5,410,344 A | 4/1995 | Graves | |
| 5,440,334 A | 8/1995 | Walters et al. | |
| 5,444,499 A * | 8/1995 | Saitoh | 348/734 |
| 5,446,490 A | 8/1995 | Blahut et al. | |
| 5,446,919 A | 8/1995 | Wilkins | |
| 5,497,185 A | 3/1996 | Dufresne et al. | |
| 5,500,681 A | 3/1996 | Jones | |
| 5,504,519 A | 4/1996 | Remillard | |
| 5,532,732 A * | 7/1996 | Yuen et al. | 725/20 |
| 5,534,911 A | 7/1996 | Levitan | |
| 5,537,143 A | 7/1996 | Steingold et al. | |
| 5,559,548 A | 9/1996 | Davis et al. | |
| 5,585,838 A | 12/1996 | Lawler et al. | |
| 5,585,865 A | 12/1996 | Amano | |
| 5,589,892 A | 12/1996 | Knee et al. | |
| 5,596,994 A | 1/1997 | Bro | |
| 5,600,364 A | 2/1997 | Hendricks | |
| 5,600,366 A | 2/1997 | Schulman | |
| 5,606,359 A | 2/1997 | Youden et al. | |
| 5,608,448 A | 3/1997 | Smoral et al. | |
| 5,619,247 A | 4/1997 | Russo | |
| 5,630,119 A | 5/1997 | Aristides | |
| 5,661,516 A | 8/1997 | Carles | |
| 5,721,827 A | 2/1998 | Logan et al. | |
| 5,724,521 A | 3/1998 | Dedrick | |
| 5,724,525 A | 3/1998 | Beyers, II et al. | |
| 5,724,607 A | 3/1998 | Brandt | |
| 5,752,159 A | 5/1998 | Faust et al. | |
| 5,754,939 A | 5/1998 | Herz et al. | |
| 5,758,257 A | 5/1998 | Herz | |
| 5,758,259 A | 5/1998 | Lawler | |
| 5,774,170 A | 6/1998 | Hite et al. | |
| 5,778,182 A | 7/1998 | Cathey et al. | |
| 5,794,210 A | 8/1998 | Goldhaber et al. | |
| 5,796,952 A | 8/1998 | Davis et al. | |
| 5,798,785 A | 8/1998 | Hendricks et al. | |
| 5,809,481 A | 9/1998 | Baron et al. | |
| 5,818,438 A | 10/1998 | Howe | |
| 5,838,314 A | 11/1998 | Neel | |
| 5,848,396 A | 12/1998 | Gerace | |
| 5,848,397 A | 12/1998 | Marsh et al. | |
| 5,850,249 A * | 12/1998 | Massetti et al. | 725/14 |
| 5,854,897 A | 12/1998 | Radziewicz et al. | |
| 5,861,906 A | 1/1999 | Dunn | |
| 5,867,226 A | 2/1999 | Wehmeyer et al. | |
| 5,872,588 A | 2/1999 | Aras et al. | |
| 5,892,508 A | 4/1999 | Howe | |
| 5,892,536 A | 4/1999 | Logan | |
| 5,917,481 A | 6/1999 | Rzeszewski | |
| 5,945,988 A | 8/1999 | Williams et al. | |
| 5,948,061 A | 9/1999 | Merriman et al. | |
| 5,973,683 A | 10/1999 | Cragun | |
| 5,983,227 A | 11/1999 | Nazem | |
| 5,991,735 A | 11/1999 | Gerace | |
| 5,991,799 A | 11/1999 | Yen et al. | |
| 6,002,393 A | 12/1999 | Hite | |
| 6,005,597 A | 12/1999 | Barrett | |
| 6,026,368 A | 2/2000 | Brown et al. | |
| 6,029,195 A | 2/2000 | Herz | |
| 6,076,094 A | 6/2000 | Cohen | |
| 6,081,840 A | 6/2000 | Zhao | |
| 6,100,916 A | 8/2000 | August | |
| 6,119,098 A | 9/2000 | Guyot et al. | |
| 6,128,009 A | 10/2000 | Ohkura et al. | |
| 6,134,531 A | 10/2000 | Trewitt et al. | |
| 6,160,570 A | 12/2000 | Sitnik | |
| 6,163,644 A * | 12/2000 | Owashi et al. | 386/46 |
| 6,029,045 A | 1/2001 | Alexander | |
| 6,172,674 B1 | 1/2001 | Etheredge | |
| 6,177,931 B1 | 1/2001 | Alexander et al. | |
| 6,185,614 B1 | 2/2001 | Cuomo | |
| 6,199,076 B1 | 3/2001 | Logan et al. | |
| 6,202,210 B1 | 3/2001 | Ludtke | |
| 6,226,618 B1 | 5/2001 | Downs et al. | |
| 6,236,975 B1 | 5/2001 | Boe | |
| 6,252,586 B1 | 6/2001 | Freeman et al. | |
| 6,279,157 B1 | 8/2001 | Takasu | |
| 6,282,713 B1 | 8/2001 | Kitsukawa | |
| 6,286,042 B1 | 9/2001 | Hasselberg et al. | |
| 6,314,568 B1 | 11/2001 | Ochiai | |
| 6,314,577 B1 | 11/2001 | Pocock | |
| 6,327,574 B1 | 12/2001 | Kramer et al. | |
| 6,345,256 B1 | 2/2002 | Milsted et al. | |
| 6,353,929 B1 | 3/2002 | Houston | |
| 6,397,057 B1 | 5/2002 | Malackowski et al. | |
| 6,400,408 B1 | 6/2002 | Berger | |
| 6,408,437 B1 | 6/2002 | Hendricks et al. | |
| 6,434,747 B1 | 8/2002 | Khoo et al. | |
| 6,446,261 B1 | 9/2002 | Rosser | |
| 6,457,010 B1 | 9/2002 | Eldering | |
| 6,463,468 B1 | 10/2002 | Buch | |
| 6,463,585 B1 | 10/2002 | Hendricks et al. | |
| 6,477,704 B1 | 11/2002 | Cremia | |
| 6,487,538 B1 | 11/2002 | Gupta et al. | |
| 6,496,818 B1 | 12/2002 | Ponte | |
| 6,505,348 B1 | 1/2003 | Knowles | |
| 6,507,839 B1 | 1/2003 | Ponte | |
| 6,510,417 B1 | 1/2003 | Woods et al. | |
| 6,530,082 B1 | 3/2003 | DelSesto et al. | |
| 6,631,360 B1 | 10/2003 | Cook | |
| 6,698,020 B1 | 2/2004 | Zigmond et al. | |
| 6,714,992 B1 | 3/2004 | Kanojia et al. | |
| 6,718,551 B1 | 4/2004 | Swix et al. | |
| 6,738,978 B1 * | 5/2004 | Hendricks et al. | 725/35 |
| 6,757,691 B1 | 6/2004 | Welsh et al. | |
| 6,766,524 B1 | 7/2004 | Matheny et al. | |
| 6,810,527 B1 | 10/2004 | Conrad et al. | |
| 6,845,396 B1 | 1/2005 | Kanojia et al. | |
| 6,850,988 B1 | 2/2005 | Reed | |
| 6,950,804 B2 | 9/2005 | Strietzel | |
| 6,983,478 B1 | 1/2006 | Grauch et al. | |
| 7,010,492 B1 | 3/2006 | Bassett et al. | |
| 7,020,652 B2 | 3/2006 | Matz | |
| 7,086,075 B2 | 8/2006 | Swix | |
| 7,212,979 B1 | 5/2007 | Matz et al | |
| 7,260,823 B2 | 8/2007 | Schlack et al. | |

| | | |
|---|---|---|
| 7,269,835 B2 | 9/2007 | Swix |
| 7,444,658 B1 | 10/2008 | Matz |
| 7,587,323 B2 | 9/2009 | Matz |
| 7,593,858 B2 | 9/2009 | Matz |
| 7,617,508 B2 | 11/2009 | Gray |
| 7,661,118 B2 | 2/2010 | Matz |
| 2001/0004733 A1 | 6/2001 | Eldering |
| 2002/0032906 A1 | 3/2002 | Grossman |
| 2002/0035600 A1 | 3/2002 | Ullman et al. |
| 2002/0046099 A1 | 4/2002 | Frengut et al. |
| 2002/0049631 A1 | 4/2002 | Williams |
| 2002/0049967 A1 | 4/2002 | Haseltine et al. |
| 2002/0056109 A1 | 5/2002 | Tomsen |
| 2002/0056118 A1 | 5/2002 | Hunter et al. |
| 2002/0078443 A1 | 6/2002 | Gadkari et al. |
| 2002/0083441 A1 | 6/2002 | Flickinger et al. |
| 2002/0092017 A1 | 7/2002 | Klosterman et al. |
| 2002/0100064 A1 | 7/2002 | Ward et al. |
| 2002/0123928 A1 | 9/2002 | Eldering et al. |
| 2002/0143647 A1 | 10/2002 | Headings et al. |
| 2002/0157108 A1 | 10/2002 | Kitsukawa et al. |
| 2002/0157109 A1 | 10/2002 | Nakano et al. |
| 2002/0169709 A1 | 11/2002 | Kitayama |
| 2002/0199197 A1 | 12/2002 | Winter |
| 2003/0028432 A1 | 2/2003 | Troyansky et al. |
| 2003/0028873 A1 | 2/2003 | Lemmons |
| 2003/0067554 A1 | 4/2003 | Klarfeld |
| 2003/0093792 A1 | 5/2003 | Labeeb et al. |
| 2003/0110489 A1 | 6/2003 | Gudorf et al. |
| 2003/0110497 A1 | 6/2003 | Yassin et al. |
| 2003/0172374 A1 | 9/2003 | Vinson et al. |
| 2004/0133467 A1 | 7/2004 | Siler |
| 2004/0163101 A1 | 8/2004 | Swix |
| 2004/0193483 A1 | 9/2004 | Wolan |
| 2004/0194131 A1 | 9/2004 | Ellis et al. |
| 2004/0261127 A1 | 12/2004 | Freeman et al. |
| 2005/0060759 A1 | 3/2005 | Rowe et al. |
| 2005/0071863 A1 | 3/2005 | Matz |
| 2005/0132419 A1 | 6/2005 | Gray |
| 2005/0137958 A1 | 6/2005 | Huber et al. |
| 2005/0235318 A1 | 10/2005 | Grauch |
| 2005/0251820 A1 | 11/2005 | Stefanik |
| 2005/0278741 A1 | 12/2005 | Robarts et al. |
| 2005/0283401 A1 | 12/2005 | Swix |
| 2006/0031882 A1 | 2/2006 | Swix |
| 2006/0075456 A1 | 4/2006 | Gray |
| 2006/0253884 A1 | 11/2006 | Gray |
| 2006/0271438 A1 | 11/2006 | Shotland et al. |
| 2006/0288367 A1 | 12/2006 | Swix |
| 2007/0226761 A1 | 9/2007 | Zalewski et al. |
| 2007/0250846 A1 | 10/2007 | Swix |
| 2007/0255622 A1 | 11/2007 | Swix |
| 2008/0004962 A1 | 1/2008 | Muthukrishnan et al. |
| 2008/0104634 A1 | 5/2008 | Gajdos et al. |
| 2008/0147497 A1 | 6/2008 | Tischer |
| 2008/0148311 A1 | 6/2008 | Tischer |
| 2008/0263586 A1 | 10/2008 | Thomas |
| 2009/0292703 A1 | 11/2009 | Matz |

FOREIGN PATENT DOCUMENTS

| | | |
|---|---|---|
| EP | 1162840 A2 | 12/2001 |
| WO | WO 9222983 A2 * | 12/1992 |
| WO | WO 9831114 | 7/1998 |
| WO | WO 99 04561 A | 1/1999 |
| WO | WO 99 45702 A | 9/1999 |
| WO | WO99/45702 | 10/1999 |
| WO | WO 99 52285 A | 10/1999 |
| WO | WO 0147156 | 6/2001 |

OTHER PUBLICATIONS

U.S. Appl. No. 10/016,988, filed Dec. 14, 2001, Matz.
U.S. Appl. No. 10/017,111, filed Dec. 14, 2001, Matz.
U.S. Appl. No. 10/017,630, filed Dec. 14, 2001, Swix.
U.S. Appl. No. 10/017,640, filed Dec. 14, 2001, Matz.
U.S. Appl. No. 10/017,742, filed Dec. 14, 2001, Matz.
U.S. Appl. No. 10/036,677, filed Dec. 21, 2001, Swix.
U.S. Appl. No. 10/735,309, filed Dec. 12, 2003, Gray.
U.S. Appl. No. 10/037,005, filed Dec. 21, 2001, Matz.
U.S. Appl. No. 10/778,345, filed Feb. 17, 2004, Swix.
U.S. Appl. No. 10/735,346, filed Dec. 12, 2003, Gray.
U.S. Appl. No. 10/036,923, filed Dec. 21, 2001, Matz.
PCT Publication No. WO 94/17609 (Kieft et al., Aug. 4, 1994).
Cauley, Leslie, "Microsoft, Baby Bell Form Video Alliance," *The Wall Street Journal*, Sep. 26, 1994.
"allNetDevices:—Report: Interactive TV Soon to Become Direct Marketing Tool," allNetDevices, www.devices.internet.com/com_cgi/print/print.cgi?url=http://devices.../report_interactive.html, (Nov. 16, 2001) pp. 1-2.
"Liberate Technologies—Solutions," Digital Cable Two-Way, www.solutions.liberate.com/architecture/dc2.html, (Nov. 16, 2001) p. 1 of 1.
"Liberate Technologies—Solutions," Digital Broadband Telco, www.solutions.liberate.com/architecture/db.html, (Nov. 16, 2001) p. 1 of 1.
"Liberate Technologies—Solutions," Liberate Connect Suite, www.solutions.liberate.com/products/connect_suite.html, (Nov. 16, 2001) pp. 1-2.
"Liberate Technologies—Solutions," Liberate imprint Server™, www.solutions.liberate.com/products/imprint_server.html, (Nov. 16, 2001) p. 1 of 1.
"Liberate Technologies—Solutions," Liberate Mediacast Server™, www.solutions.liberate.com/products/mediacast_server.html, (Nov. 16, 2001) pp. 1-2.
"Spike High Performance Server Array," Mixed Signals Technologies, Inc., www.mixedsignals.com, itvinfo@mixedsignals.com (2000) p. 1.
"power, flexibility, and control," RespondTV, www.respondtv.com/whyrespond.html (Nov. 16, 2001) pp. 1-2.
"It just clicks!," RespondTV, www.respondtv.com/inaction.html, (Nov. 16, 2001) pp. 1-2.
"The Wink System," Wink System Diagram, www.wink.com/contents/tech_diagram.html, (Nov. 16 2001) p. 1 of 1.
"What is Wink?," www.wink.com/contents/whatiswink.html, (Nov. 16, 2001) p. 1 of 1.
"How Wink Works," What is Wink: How wink works, www.wink.com/contents/howitworks.html, (Nov. 16, 2001) p. 1 of 1.
Cauley, Leslie, "Microsoft, Baby Bell Form Video Alliance," *The Wall Street Journal*, Sep. 26, 1994.
"allNetDevices:—Report: Interactive TV Soon to Become Direct Marketing Tool," allNetDevices, www.devices.internet.com/com_cgi/print/print.cgi?url=http://devices.../report_interactive.html, (Nov. 16, 2001) pp. 1-2.
"Liberate Technologies—Solutions," Digital Cable Two-Way, www.solutions.liberate.com/architecture/dc2.html, (Nov. 16, 2001) p. 1 of 1.
"Liberate Technologies—Solutions," Digital Broadband Telco, www.solutions.liberate.com/architecture/db.html, (Nov. 16, 2001) p. 1 of 1.
"Liberate Technologies—Solutions," Liberate Connect Suite, www.solutions.liberate.com/products/connect_suite.html, (Nov. 16, 2001) pp. 1-2.
"Liberate Technologies—Solutions," Liberate imprint Server™, www.solutions.liberate.com/products/imprint_server.html, (Nov. 16, 2001) p. 1 of 1.
"Liberate Technologies—Solutions," Liberate Mediacast Server™, www.solutions.liberate.com/products/mediacast server.html, (Nov. 16, 2001) pp. 1-2.
"Spike High Performance Server Array," Mixed Signals Technologies, Inc., www.mixedsignals.com, itvinfo@mixedsignals.com (2000) p. 1.
"power, flexibility, and control," RespondTV, www.respondtv.com/whyrespond.html (Nov. 16, 2001) pp. 1-2.
"It just clicks!," RespondTV, www.respondtv.com/inaction.html, (Nov. 16, 2001) pp. 1-2.

"The Wink System," Wink System Diagram, www.wink.com/contents/tech_diagram.html, (Nov. 16, 2001) p. 1 of 1.

"What is Wink?," www.wink.com/contents/whatiswink.html, (Nov. 16, 2001) p. 1 of 1.

"How Wink Works," What is Wink: How wink works, www.wink.com/contents/howitworks.html, (Nov. 16, 2001) p. 1 of 1.

"What is Wink: Examples," What is Wink—Examples, www.wink.com/contents/examples.html, (Nov. 16, 2001) pp. 1-2.

"Nielsen Media Research—Who We Are & What We Do," www.nielsenmedia.com/whoweare.html, (Oct. 11, 2001) pp. 1-4.

www.actv.com, Screen Print, Oct. 8, 2000.

"ACTV, Inc. Offers Exclusive Preview of 'Individualized Television' at Official All-Star Café," Business Wire, Sep. 16, 1998.

"ACTV's HyperTV & 'Individualized Television' to be Powered by Sun Microsystems' JavaTV Technology," Business Wire, Apr. 21, 1999.

Whitaker, Jerry, "Interactive TV: Killer Ap or Technical Curiosity?", Broadcast Engineering, Dec. 1999.

Dickson, Glen, "Digital TV gets specifically directed," Broadcasting & Cable, Jun. 5, 2000.

Reed, David, "The future is digital," Precision Marketing, v. 13, n. 51, p. 27, Sep. 21, 2001.

Aggarwal et al ("A Framework for the Optimizing of WWW Advertising" Proceedings fo the International IFIP/GI Working Conference Trends in Distributed Systems for Electronic Commerce, pp. 1-10, Year of Publication: 1998).

Wasserman, Todd, "Mining Everyone's Business." Brandweek, Feb. 28, 2000. 19 pages.

U.S. Appl. No. 08/779,306, Grauch.
U.S. Appl. No. 10/017,742, Matz.
U.S. Appl. No. 12/508,653, Matz.
U.S. Appl. No. 10/017,111, Matz.
U.S. Appl. No. 10/039,062, Matz.
U.S. Appl. No. 10/020,779, Swix.
U.S. Appl. No. 12/567,828, Gray.
U.S. Appl. No. 12/692,040, Swix.
U.S. Appl. No. 12/642,905, Matz.

* cited by examiner

| Time | | Content |
|---|---|---|
| 1:00 | :00 | NCAA Basketball |
| | :15 | NCAA Basketball, Local News Ad, Sporting Goods Ad 1, Sporting Event Ad |
| | :30 | NCAA Basketball |
| | :45 | NCAA Basketball, Automobile Ad 1 |
| 2:00 | :00 | NCAA Basketball |
| | :15 | NCAA Basketball, Sports Ad, Sports Drink Ad, Automobile Ad 2, PGA Golf Tournament |
| | :30 | DVD Movie – Science Fiction |
| | :45 | DVD Movie – Science Fiction DVD Movie |
| 3:00 | :00 | DVD Movie – Science Fiction DVD Movie |
| | :15 | DVD Movie – Science Fiction DVD Movie |
| | :30 | DVD Movie – Science Fiction DVD Movie |
| | :45 | DVD Movie – Science Fiction DVD Movie |
| 4:00 | :00 | DVD Movie – Science Fiction DVD Movie |
| | :15 | NBA Basketball, Automobile Ad 3, Credit Card Ad 1, Airline Ad 1 |
| | :30 | NBA Basketball |
| | :45 | NBA Basketball, Tourism Ad 4, Restaurant Ad, Sporting Goods Ad 2 |
| 5:00 | :00 | NBA Basketball |
| | :15 | NBA Basketball, Local Retailer Ad. Sporting Goods Ad 1 |
| | :30 | NBA Basketball |
| | :45 | NBA Basketball , Airline Ad 1, Automobile Ad 4, Credit Card Ad 2 |
| | :00 | NBA Basketball |

FIG. 5

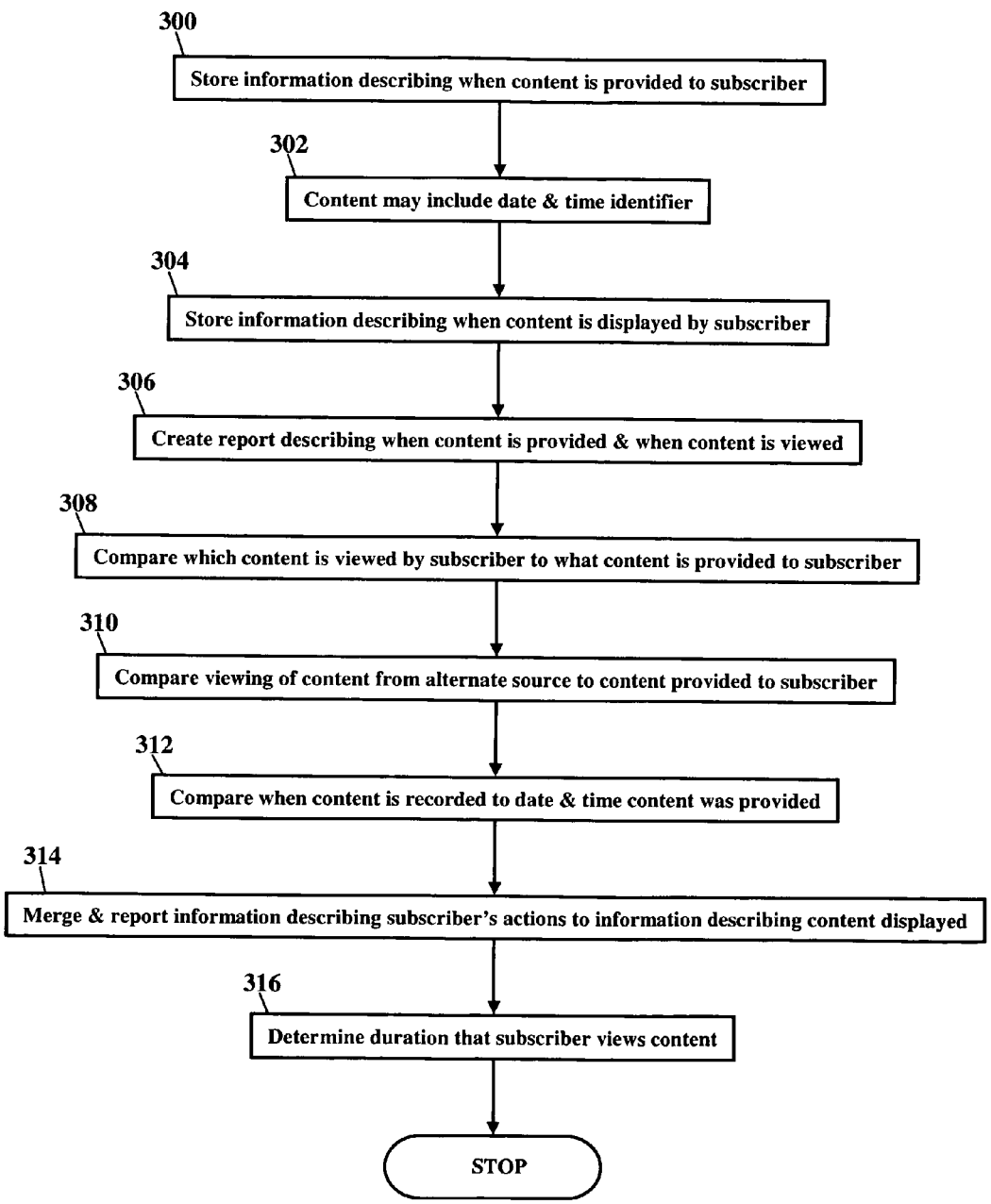

SYSTEMS, METHODS AND PRODUCTS FOR ASSESSING SUBSCRIBER CONTENT ACCESS

CROSS REFERENCE TO RELATED APPLICATIONS

This application is a continuation-in-part of U.S. patent application Ser. No. 11/154,248, by Grauch et al. filed Jun. 16, 2005, which is itself a continuation of U.S. patent application Ser. No. 09/496,825, by Grauch et al., filed Feb. 1, 2000, and now issued as U.S. Pat. No. 6,983,478, which is itself a continuation of U.S. patent application Ser. No. 08/779,306, by Batten et al., filed Jan. 6, 1997 (now abandoned), with each incorporated herein by reference in their entirety. This application is also a continuation-in-part of U.S. application Ser. No. 10/017,630, filed Dec. 14, 2001 and entitled "System and Method for Developing Tailored Content", and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to the measurement of content-access patterns and, more particularly, to creating content related to subscriber content-access patterns and associated behaviors.

Individuals receive information and entertainment content from a wide variety of media sources. These sources include radio, newspapers, the Internet, and television content providers.

To support the creation and distribution of content, providers must derive revenue from the content. For example, television content providers derive substantial revenues from advertising. During the broadcast of a television program, advertisements, in the form of commercials, are inserted at various time intervals. An advertiser pays the broadcaster to insert the advertisement. Other sources of revenue include pay-per-view, subscription, and licensing fees paid by subscribers for specific content or content-related packages. Internet content providers derive revenue in similar ways.

The amount of money that an advertiser pays is related to the number of subscribers watching or accessing a broadcast. Conventionally, for television advertising, advertising revenue equals a rate per thousand viewers multiplied by the number of viewers estimated to be viewing a program. Web site content providers charge advertisers a fixed amount per advertising impression. Also, Pay-per-view, subscriptions, and licensing fees all increase as the number of viewers of content increase. Therefore, the higher the number of viewers or subscribers accessing content, the greater the revenue.

In the case of television programming, if a program is popular, the provider charges a higher advertising rate. In contrast, if a television program cannot produce at least as much revenue as it costs to produce the program, the provider will generally cancel the program. Therefore, television-programming providers are very interested in determining the popularity of specific programs Additional factors beyond the popularity of a program may affect the number of viewers who watch it. For example, a program scheduled adjacent to a popular program or between two popular programs may attain higher ratings than it might achieve without such opportune scheduling. A similar effect occurs on web sites. A large number of web site users may read content posted on a popular web site. However the same piece appearing on a less popular site may attract little attention. Therefore, content providers are interested in determining the interrelationships between various combinations of content and content types.

Conventional television programs and programming packages are designed to appeal, to the extent possible, to a large group of individual subscribers. Appealing to a large number of subscribers requires compromises that may lessen the appeal of a particular program or programming package to any one individual subscriber. And the less the appeal of a particular programming package to a subscriber, the less the subscriber will pay for the package. These same compromises are required when an advertiser produces a marketing campaign for use in television or creates a marketing bundle, which combines a programming or advertising package with products and services.

Content providers conventionally utilize various methods to evaluate the popularity of content and to evaluate the interrelationships between content. For example, a television-programming provider may implement a program of voluntary logging of television viewing by a viewer, followed by transmission and human processing to analyze the information contained in the log. In addition, a provider may utilize telephone, mail, or other types of surveys to inquire from random or selected viewers about the viewers' viewing habits and request their recollections regarding their viewing patterns. A provider may also utilize automated monitoring systems that attempt to intercept television channel choices and changes, record these events, and provide the recording to a clearinghouse or other facility for further processing.

The provider may enlist a ratings company to perform the monitoring and processing. For example, Nielsen Media Research (Nielsen Media Research, Inc., New York, N.Y.), Arbitron (Arbitron Inc., New York, N.Y.), and MeasureCast (MeasureCast, Inc., Portland, Oreg.) provide third-party monitoring and processing capability for television, radio, and Internet content.

The Nielsen Media Research (Nielsen) Ratings are perhaps the best known of the various third-party ratings services. Nielsen utilizes a variety of conventional sampling methods to determine the number of viewers watching a particular show. For example, in five thousand homes, Nielsen installs a People Meter. The People Meter records viewing patterns from television sets, cable television set-top boxes, videocassette recorders, satellite television set-top boxes, and other sources of television programming. The People Meter records what content the particular device is providing on an ongoing basis and periodically transmits this information to servers within a Nielsen facility. Nielsen combines the data uploaded from the People Meter with media content data to determine what programming and advertising a device displayed. Nielsen uses the combined data to provide a rating for each program and advertisement. In conjunction with the People Meter, Nielsen also utilizes viewer diaries and surveys to gather information from a broader spectrum of television viewers and to confirm the results generated by the People Meter.

Arbitron Inc. (Arbitron) is well known for providing radio broadcast ratings. Arbitron compiles ratings by utilizing surveys. Arbitron also provides television ratings based on various sampling techniques. In cooperation with Nielsen, Arbitron has developed a Portable People Meter to measure television ratings. The Portable People Meter is a pager-sized device, worn by a participant in a survey. The Portable People Meter records viewing by recording sounds encoded into each broadcast, which identify the program or advertisement. The survey participant periodically plugs the Portable People Meter into a recharger, which also includes a communicator that uploads the data in the Portable People Meter into a remote Arbitron server. The Portable People Meter may be a more accurate method of television ratings than a set-top box, such as the set-top box used by Nielsen. The Portable People Meter offers the advantage of capturing viewing outside of the home and of recognizing when the viewer is not within audible range of a television, and therefore, less likely to be viewing a particular program or advertisement.

As the use of the Internet increases, the distribution of programming via Internet channels becomes more important. MeasureCast, Inc. (MeasureCast) provides a ratings system for Internet media streaming. MeasureCast records the number of streams requested from a streaming server and provides reports to programming providers and advertisers detailing the popularity of particular streams. As is the case in traditional broadcast media, the more popular the stream, the higher the advertising rate a broadcaster is able to charge.

Nielsen, Arbitron, and MeasureCast provide direct methods of measuring the popularity of a program. Various indirect methods are also used to determine the popularity of programming and the effectiveness of advertising. For example, advertising effectiveness is often measured in terms of viewer attitudes and subsequent viewer actions, such as purchases, inquiries, behavior changes, and other actions. Method of obtaining these indirect measures include: focus group tests, post-advertising surveys questioning whether an advertisement was viewed, remembered and possible impact, and measures of product purchases or other indirect results that may indicate whether or not an advertising campaign has been successful.

Conventional systems and methods for determining subscriber content-access patterns and preferences are inefficient and poorly suited for the immediate, timely creation of customized content. In addition, conventional systems, such as the Nielsen and Arbitron meters rely on extremely small samples, which may not be representative of the target market for a particular advertiser.

Also, surveys are expensive and highly dependent on identifying individuals that may have been viewing television at the time of the advertisement. And post-advertising results measurements suffer from questions of causality and external influences. Focus groups allow reasonably efficient low-volume viewer analysis, but statistical analysis requires an adequate number of participants and tightly controlled tests, a combination that may be difficult to achieve.

Conventional systems and methods lack simple, effective, and efficient means for determining content genre preferences. Conventional systems and methods also lack simple and efficient means for determining the duration of viewing patterns, especially as those patterns are affected by the genre or type of content, the time-of-day of a broadcast, and the content broadcast simultaneously with or adjacently to the content of interest. The conventional systems and method also fail to indicate whether a subscriber immediately views distributed content or, rather, views the content at a later time, indicating a recorder has been used. The conventional systems and methods (such as a TIVO® recorder and other recording devices and services) (TIVO® is a registered trademark of TiVo, Inc.) do not accumulate and forward this data to service providers.

SUMMARY

The exemplary embodiments provide systems and methods for tailoring media content and related offerings to individual subscribers. The exemplary embodiments disclose a subscriber database, a data analyzer electronically connected to the subscriber database, and a distribution server. The data analyzer uses subscriber attributes in the subscriber database to create tailored content and content-related offerings. The tailored content is subsequently distributed by the distribution server.

The subscriber database includes attributes of a subscriber as well as a media-content-access history of the subscriber. Attributes of a subscriber include demographic measures of the subscriber. The media-content-access history of the subscriber may comprise a subscriber content-choice database.

In order to merge content and subscriber actions, the exemplary embodiments may also include a merge processor and national and local content databases. Also, in order to categorize programming and advertising, a category database is electronically linked to the media-content database. The category database may comprise a program category or genre database and/or an advertisement category database. The merge processor operates to assign a category to a media-content detail and create a content choice record by merging a subscriber action detail with the categorized media-content detail. The exemplary embodiments may comprise a computer-readable medium comprising computer code to implement the process.

The merge processor receives a series of subscriber actions, merges the actions with media-content detail, and then attempts to correlate the actions with one another. The merge processor may also assign a category to the media-content detail and perform a probability analysis on the subscriber content choice information created as a result of the process in order to predict future subscriber actions.

A subscriber action database may contain additional information, including a subscriber identifier and a clickstream database. The media-content database includes programming and/or advertising content. Programming and advertising information may be included in a single database or in multiple databases. Each of these databases includes a common key data element.

The exemplary embodiments provide numerous advantages over conventional systems for using subscriber content-choice information to tailor content-related offerings for individual subscribers or to small groups of subscribers.

It is difficult and inefficient in conventional systems to tailor content-related offerings because the information necessary to tailor the offerings is often unavailable. The subscriber-specific data is made available by merging subscriber content choices with various other subscriber attributes. Content providers are able to tailor content-related offerings and charge a premium for these offerings.

Exemplary embodiments disclose methods for accessing subscriber content access. One such method stores when content is provided to a subscriber and when that content is displayed by the subscriber. The method also reports when the content is provided and when the content is viewed. Marketers, advertisers, and content providers may then know whether the subscriber is immediately viewing the provided content or, rather, viewing the content at a later time. Such information may be used to improve marketing and advertising efforts and strategies.

Exemplary embodiments also disclose systems for accessing subscriber content access. The system comprises an operating system stored in memory and a processor communicating with the memory. The processor stores when content is provided to a subscriber. The processor also stores when that content is displayed by the subscriber. The processor also reports when the content is provided and when the content is viewed.

Exemplary embodiments also disclose a computer program product for accessing subscriber content access. The computer program product comprises a computer-readable medium and an analyzer stored on the computer-readable medium. The analyzer comprises computer code for storing when content is provided to a subscriber. The analyzer also stores when that content is displayed by the subscriber. The analyzer also reports when the content is provided and when the content is viewed.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE FIGURES

These and other features, aspects, and advantages of the exemplary embodiments are better understood when the following Detailed Description is read with reference to the accompanying drawings, wherein:

FIG. 5 is a table illustrating the programming viewed by the subscriber during the period shown in FIGS. 3A, 3B, and 4, according to exemplary embodiments.

FIG. 12 is a flowchart illustrating a method for accessing subscriber content access, according to still more exemplary embodiments.

DETAILED DESCRIPTION

Exemplary embodiments provide systems and methods for creating tailored television content-related offerings based on subscriber-specific data. Offerings may be tailored based solely on subscriber content choices or based on subscriber content choices in combination with other attributes of the subscriber such as demographics, purchasing history, and/or other relevant attributes.

Various types of offerings may be made available in exemplary embodiments. For example, a cable television content provider may create a direct marketing campaign based on subscriber data. In addition, a television content provider may create a programming offering tailored to an individual subscriber's needs and measured preferences. Any content provider determines an individual subscriber's willingness to pay for a programming offering based on subscriber-related information.

In other exemplary embodiments, a television content provider utilizes information in a subscriber database to develop incentives, which are made available to viewers evidencing "desirable viewer patterns." Such special incentives would be of value to advertisers as well as to television program providers. In addition, a content provider may use the information to bundle programming offerings with other products and services.

In exemplary embodiments a subscriber's television viewing patterns are combined with programming and advertising media-content detail to determine the subscriber's content choices. These content choices are categorized so that the data may be analyzed at various levels and from various perspectives. In other exemplary embodiments, a subscriber's content choice is correlated with preceding and succeeding content choices to determine how various combinations of advertising and programming content affect a subscriber's content choices.

Figure 1:
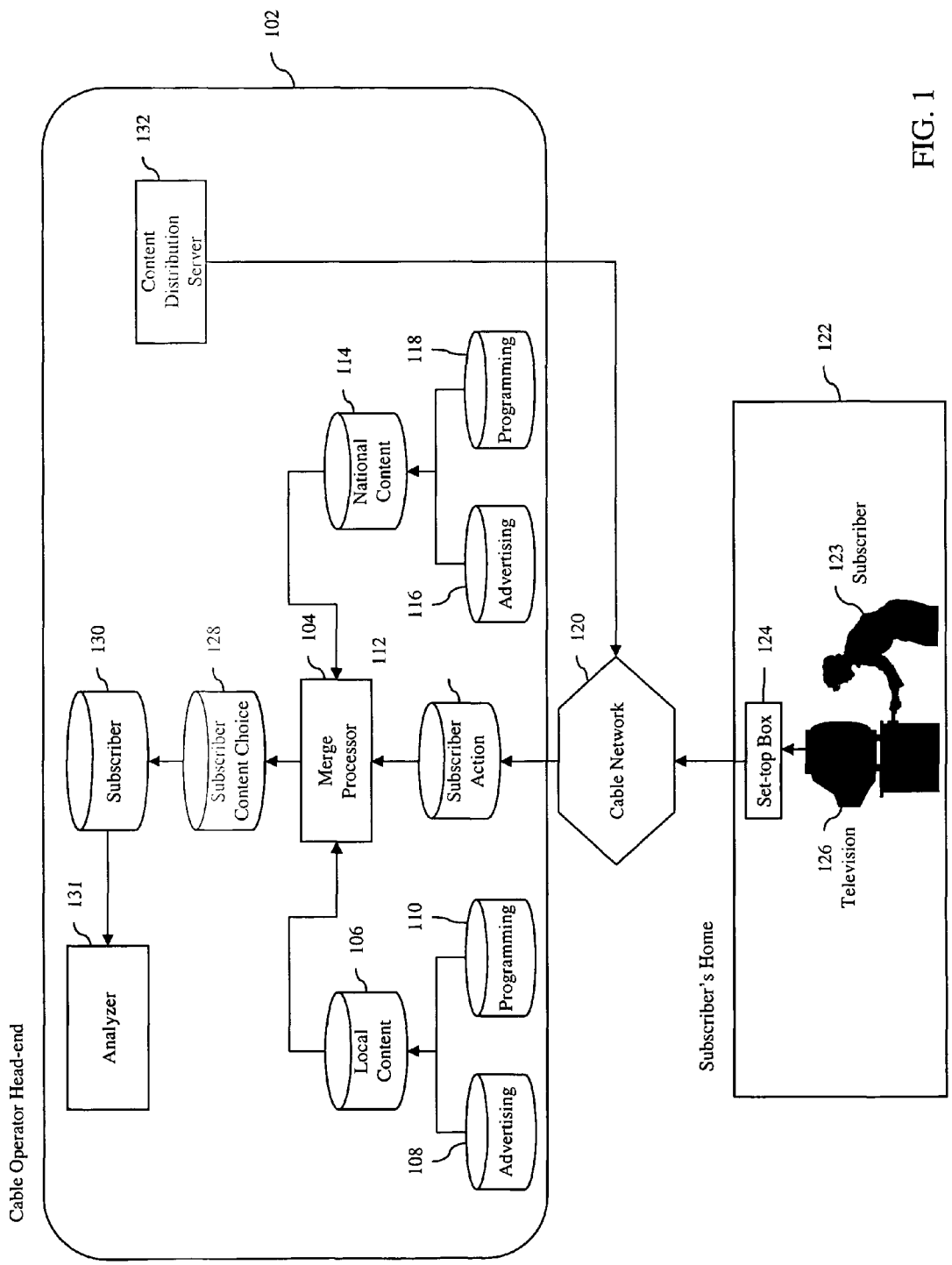
FIG. 1 is a schematic illustrating an exemplary operating environment.

FIG. 1 is a block diagram illustrating an operating environment, according to exemplary embodiments. A cable operator's head-end facility 102 includes a merge processor 104, which is in communication with a plurality of databases. These databases include a local-content database 106, a subscriber-action database 112, and a national-content database 114. The merge processor 104 is programmed to receive and merge data from the two databases 112, 114.

The local-content database 106 includes information from the advertising 108 and programming 110 databases. The advertising database 108 includes information related to local advertising produced and/or provided by the cable operator or other local source. Likewise, the programming database 110 includes information related to locally produced and/or provided programming. The advertising database 108 includes attributes of advertisements, such as the advertiser, producer, brand, product type, length of the content, and other descriptive information. The programming database 110 includes similar information related to programming, including the producer, type of programming, length, rating, and other descriptive information. The local-content 106, programming 108, and advertising 110 databases include a date-time identifier, which indicates when a program or advertisement has been provided. The date-time indicator provides a key value for merging various databases with one another.

The cable operator head-end 102 may also include a national-content database 114. The national-content database 114 includes information from an advertising database 116 and a programming database 118. The information contained in each of these respective databases is similar to that contained in the local advertising 108 and programming 110 databases. However, the content is produced for a national audience and subsequently provided to the cable operator. The national-content 114, programming 118, and advertising 116 databases also include a date-time identifier.

The cable operator head-end 102 may also include a subscriber-action database 112. The subscriber-action database 112 includes the actions taken by subscribers while viewing television sets. For example, the subscriber-action database 112 is in communication with cable network 120. A processor (not shown) in cable network 120 receives any subscriber actions transmitted via cable network 120 and inserts the actions as records in subscriber-action database 112. Also in communication with cable network 120 is a set-top box 124, which is installed in a subscriber's home 122. Also located in subscriber's home 122 is a television (TV) 126. As a subscriber 123 makes viewing choices on TV 126 via set-top box 124, these choices or actions are transmitted via a processor (not shown) in cable network 120 to the subscriber-action database 112.

The subscriber-action database may include a clickstream database. A clickstream database is common in Internet monitoring applications. Each time a web-browser user clicks on a link in a web page, a record of that click is stored in a conventional clickstream database. A database that includes similar information for television viewers is disclosed in a patent application filed on May 25, 2000 by Edward R. Grauch, et. al., Ser. No. 09/496,92, entitled "Method and System for Tracking Network Use," which is hereby incorporated by reference. In the database described, each action taken by a television subscriber 123, such as "channel up" and "channel down" are stored in a database with a date-time stamp to allow tracking of the television subscriber's actions.

A merge processor 104 receives information from the local-content 106, national-content 114, and subscriber-action 112 databases and merges the data based on date-time attributes of the data. For example, a detail record in the subscriber-action database 112 indicates that a subscriber's set-top box 124 was tuned to channel 12, a National Broadcasting Company (NBC) affiliate. A record in the national-content database 114 indicates that at the same point in time, NBC was broadcasting a Professional Golf Association (PGA) tournament. A record in the local-content database 106 further indicates that the cable provider preempted the PGA tournament to broadcast an infomercial for a real estate investment strategy video. The merge processor 104 receives information from each of these sources and determines that at the point in time of interest, the subscriber 123 was watching the infomercial. The merge processor stores the resultant data in the subscriber content-choice database 128. The merge processor may collect information from the various databases rather than receiving it. For example, a program on the merge processor 104 includes instructions for connecting to the various databases and extracting data from each one.

The subscriber content-choice database 128 may include merged information for a period of time and for a plurality of subscribers. For example, a program provider may wish to track the popularity of a program for several thousand subscribers for an entire month. Another provider may be interested in analyzing the seasonal differences in subscriber viewing behaviors.

FIG. 1 also includes a subscriber database 130. Subscriber database 130 includes various attributes about a subscriber. In addition, subscriber database 130 includes information from subscriber content-choice database 128.

An analyzer 131 accesses the information in the subscriber database 130. The analyzer 131 provides tools to an analyst or other person associated with a content provider to discern patterns in the subscriber database 130 for which specific programming or advertising packages are developed. The analyzer 131 may include simple query tools or may include complex online analytical processing tools, such as a multidimensional database or data mining application.

Exemplary embodiments may include a content distribution server 132. Once a content provider has created content tailored to individual subscribers, the content provider places the content on the content distribution server 132. A content distribution server 132 may include, for example, a digital video storage and broadcast server. The content distribution server 132 distributes the tailored content to a subscriber's set-top box 124 via cable network 120.

Although the cable network shown is a two-way digital cable network, various other network types may also be utilized. For example, in one embodiment, subscriber's home 122 receives cable service via a digital one-way cable system. In such a system, set-top box 124 may communicate subscriber actions to subscriber-action database through a modem and telephone connection periodically. The subscriber 123 may receive content through a digital subscriber line (DSL) from a DSL provider. In a DSL system, the set-top box 124 is able to perform two-way communications and can therefore transmit subscriber actions to subscriber-action database 112 directly.

Although the various databases and merge processor 104 are shown located in the head-end facility 102, the databases and merge processor 104 may exist as software within the set-top box 124 or as software residing within a television network's facility (not shown). The data may be captured and analyzed by programming and advertising producers or distributors or may be utilized within a subscriber's set-top box 124 to provide advanced services tailored to the subscriber 123.

Figure 2:
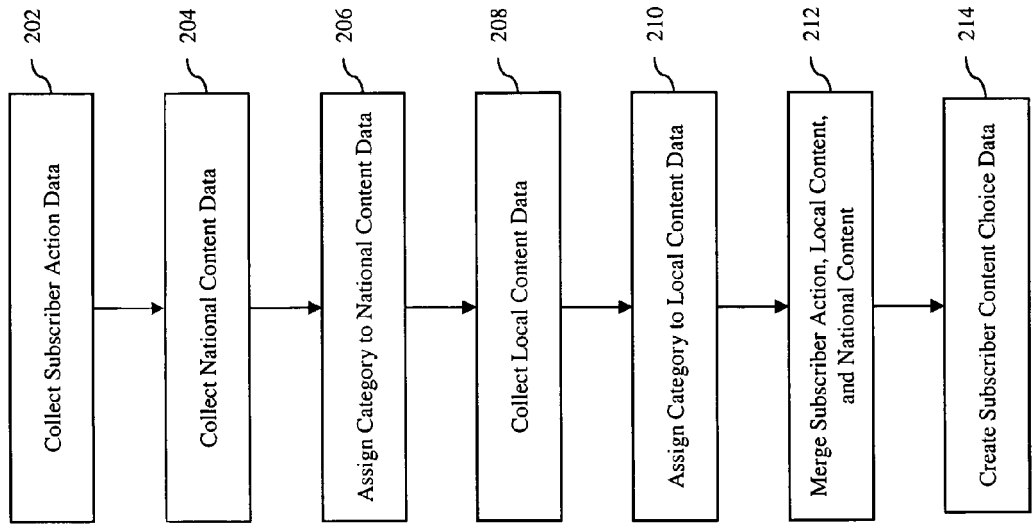
FIG. 2 is a flowchart illustrating a process implemented by a merge processor, according to exemplary embodiments.

FIG. 2 is a flowchart illustrating the general process the merge processor (104) shown in FIG. 1 implements to categorize and merge data from the various databases. FIGS. 3-5 illustrate the process in greater detail.

Referring to FIG. 2, merge processor (104) receives subscriber action data from the subscriber-action database (112) 202. Subscriber action data may include data indicating that the subscriber 123 viewed an alternate data source for a period of time. For example, the subscriber 123 may view video from a VCR or DVD or other video source for a period of time. This video source supersedes both national and local-content in the subscriber content-choice database 128.

The merge processor (104) also receives data from the national-content database (114) 204. National-content data includes data describing media, such as programming and media, supplied by national providers. The merge processor (104) next assigns a category or genre to the national-content data 206. A genre is a specific type of category used in relation to artistic compositions, and genre and category are used interchangeably herein. The merge processor (104) assigns categories to content based on attributes of the content. For example, a program has a name and a creation date. The name of the program is "Wake Forest University vs. Duke University Basketball Game," and a creation date equal to the current date. The merge processor (104) uses logic in a computer program to determine that the program should be categorized as a "Live Sporting Event." The merge processor (104) may assign multiple categories to a single program, such as "Basketball," "Sports," "College-Related Programming," or some other broad descriptive term.

The merge processor also receives data from the local-content database (106) 208. The merge processor (104) then assigns a category to the local-content data 210 in a manner similar to the process of assigning a category to national-content data.

Once the merge processor has assigned a category to data in each of the content databases, the merge processor merges the categorized content data, national and local, with data from the subscriber-action database (112) 212 and creates records with the combined data in the subscriber content-choice database (128) 214. Since the content data was categorized prior to the merge process, the data in the subscriber content-choice database 214 retains the assigned categories. Therefore, data in the subscriber content-choice database 214 can be sorted, filtered, reported, and used for various other processes, which utilize groupings of the data.

The subscriber content-choice database 128 may be implemented in various ways. For example, the database 128 may simply be a number of tables in a relational database. To simplify the process of querying the data, the database may include an online analytical processing tool, such as a multi-dimensional database.

Figure 3A:
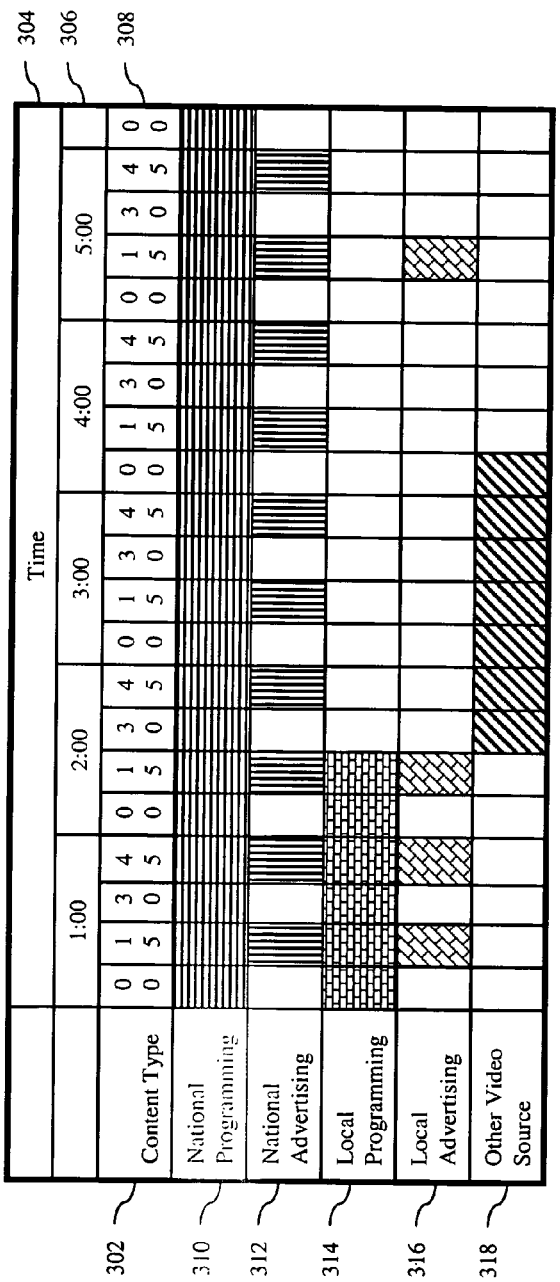
FIG. 3A is a table illustrating various sources of programming and advertising content available to a subscriber during a period of time, according to exemplary embodiments.
Figure 3B:
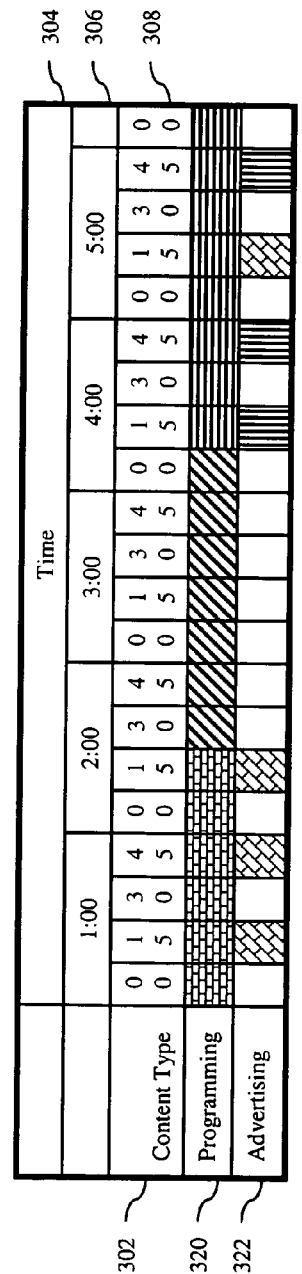
FIG. 3B illustrates content displayed on a subscriber's television during a period of time, according to exemplary embodiments.
Figure 4:
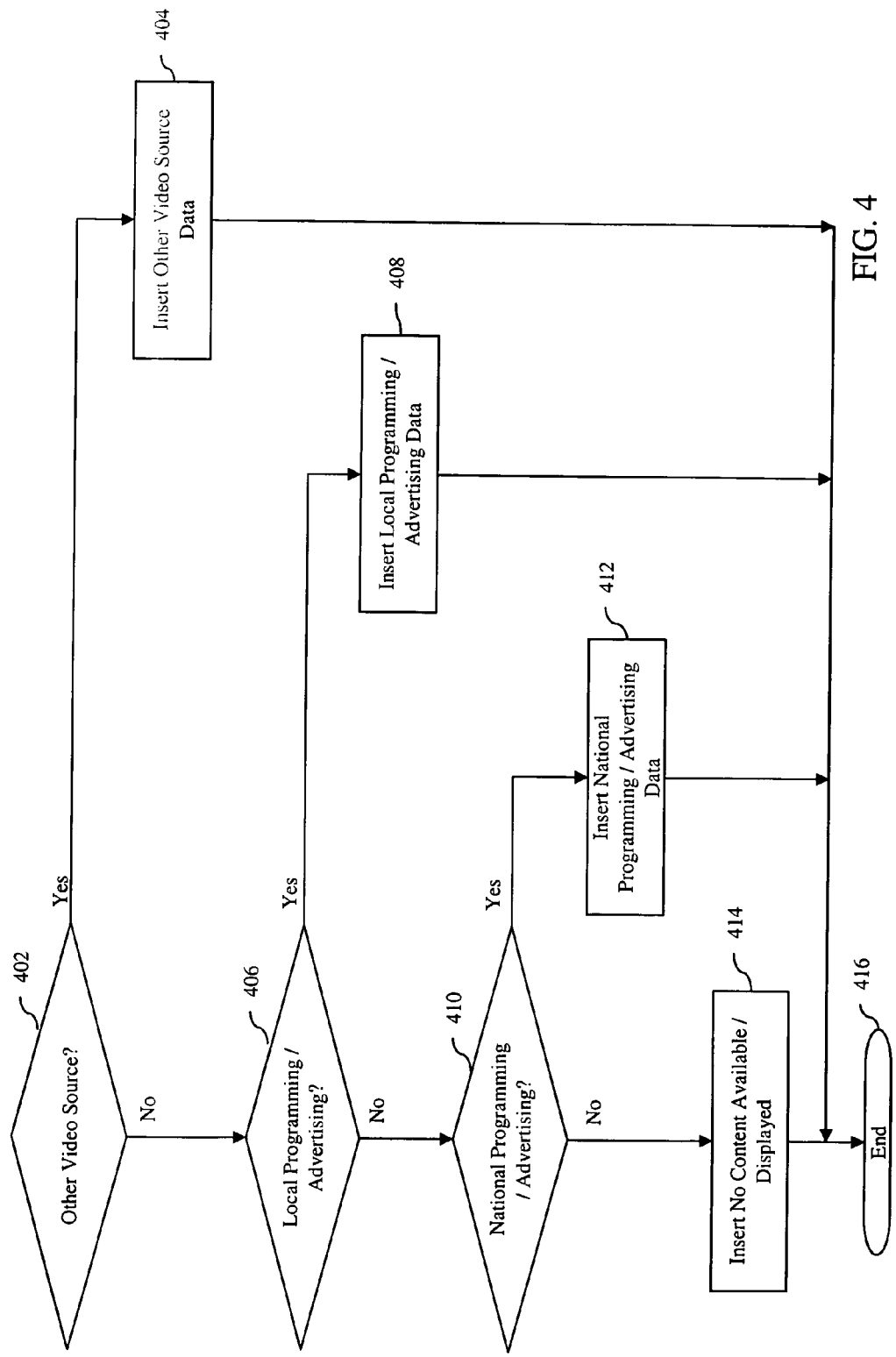
FIG. 4 is a flowchart illustrating the process of merging the data shown in FIG. 3A to create the merged data shown in FIG. 3B, according to exemplary embodiments.

FIG. 3A illustrates the sources of programming and advertising content available to the subscriber 123 while the set-top box 124 is tuned to a single channel. FIG. 3B illustrates the content displayed on the TV. FIG. 4 is a flowchart illustrating the process of merging the various content types shown in FIG. 3A to determine the content displayed on a particular channel.

FIG. 3A includes a Content Type column 302. The various content types displayed in the Content Type column 302 are shown in relation to Time 304. Time 304 in FIG. 3A is divided into hour 306 and quarter-hour 308 segments. FIG. 3A represents a simplistic scenario in which set-top box 124 is tuned to a single channel. Therefore, the Content Type 302 column includes five types of content: National Programming 310, National Advertising 312, Local Programming 314, Local Advertising 316, and Other Video Source 318. In order to present a simplified view of the available content types during the period, several content types overlap, when in reality, they would actually occur in series. For example, National Programming 310 and National Advertising 312 do not occur at the same time, but it is likely that programming and advertising both would be broadcast for at least some period of time during the fifteen minute periods of overlap shown in FIG. 3A. For example, during a television program provided by a broadcast network, a two or three-minute break occurs approximately every fifteen minutes. Therefore, a fifteen-minute period in which a three-minute break occurs will include twelve minutes of programming and three minutes of advertising.

As shown in FIG. 3A, multiple types of content may be provided during any period of time. The fact that the content is provided does not indicate that it is available on the set-top box (124) or that the subscriber 123 is viewing the content. For example, in the embodiment shown, the cable provider provided National Programming 310 continuously throughout the period. The provider provided National Advertising 312 approximately every 15 minutes during the same period. Also, the cable provider provided Local Programming 314 from 1:00 until 2:30, and Local Advertising 316 approximately every 15 minutes during that period. The cable provider subsequently provided Local Advertising 316 during the period beginning at 5:15. Also during the period shown in FIG. 3A, the subscriber 123 viewed input from the Other Video Source 318, e.g., VCR or DVD, from 2:30 until 4:15.

FIG. 4 illustrates the process for determining which programming is displayed on the subscriber's television during any specific period of time and inserting that data into the subscriber content-choice database 128 if the subscriber 123 is viewing that channel. Although various sources of content, such as a cable TV channel or a DVD movie, may be available to the subscriber (123) during any period of time, the subscriber (123) generally views only one source of programming or advertising at any one time. In addition, a content provider, such as a cable operator, makes determinations regarding which content will be available via a communications channel.

A computer program executing on merge processor (104) may process the potentially viewable data sources as a hierarchy. The program first determines, using information in the subscriber-action database (112) whether the subscriber (123) was viewing another video source, such as a VCR or DVD 402. If so, the program inserts data describing the other video source 404 into the subscriber content-choice database (128), and the process ends 416.

If the subscriber (123) was not viewing an alternate source of video and was tuned to a particular channel, then the subscriber (123) was viewing the content provided by the cable operator on that channel. To determine what content was provided by the cable provider, the program executing on the merge processor (104) determines whether the cable provider was providing local programming or advertising during the period of time 406 by accessing the local-content database (106). If so, the program inserts data describing the local programming or advertising 408 into the subscriber content-choice database (128), and the process ends. If the cable provider was not providing local programming or advertising, the program determines whether or not the provider was providing national programming or advertising 410 by accessing the national-content database (114). If so, the program inserts data describing the national programming or advertising 412 into the subscriber content-choice database (128); and the process ends 416.

If the program determines that the subscriber 123 was not viewing another video source and the provider was providing no content, the program either inserts a record in the subscriber content-choice database 128 indicating that no content was available during the specific period of time or inserts no data at all 416. For example, if TV 126 is left on after a broadcaster ends broadcasting for the rest of the day, no content is available after the broadcaster ceases broadcasting, so either a record indicating the lack of content is inserted, or no data is inserted.

The process illustrated in FIG. 4 may be repeated for each period of time that is of interest for analyzing the data. The result of the process is a plurality of records describing a subscriber's viewing patterns during a period of time. The subscriber content-choice database (128) includes data from a plurality of subscribers as well. The databases and processor (104) in such an embodiment are configured appropriately to process the anticipated volume of data.

In FIGS. 3A and 3B, the process is repeated for each quarter hour. The time period may be divided into smaller increments, such as tenth-of-a-second increments.

FIG. 3B illustrates the result of merging the data records shown in FIG. 3A using the process illustrated in FIG. 4. As in FIG. 3A, FIG. 3B is a simplistic view of this data, including the Content Type 302 and the various slices of time 304, 306, 308. In the table shown in FIG. 3B, the Content Type column 302 includes only a Programming 320 and an Advertising 322 row.

As shown in FIG. 3A, during the period from 1:00 until 2:30, the cable provider provides local programming and advertising 312, 314. The process of FIG. 4 determined that the subscriber 123 was viewing no other video source 318, and therefore, the program inserts data into the subscriber content-choice database 128 related to local programming and advertising 320, 322. During the period beginning at 2:30 and ending at 4:15, the subscriber 123 viewed video from another source 318. Therefore, the program inserts data related to the other source for this time period. During the period from 4:15 until 5:15, the provider provided national programming and advertising with the exception of the period from 5:15 until 5:30, during which local advertising was provided. The program inserts this data into the subscriber content-choice database.

FIG. 5 is a table illustrating the programming that the subscriber 123 viewed during the period shown in FIGS. 3A and 3B. As with FIGS. 3A and 3B, the table includes a Time section 502 and a Content section 504. The Time section 502 is divided into hour and quarter-hour segments.

According to FIGS. 3A and 3B, between 1:00 and 2:30, the subscriber 123 viewed local programming and advertising. By accessing the local-content database (106), the merge processor (104) determines that the local programming consisted of a NCAA (National Collegiate Athletic Association) basketball game and local advertising 506.

According to FIGS. 3A and 3B, during the period from 2:30 until 4:15, the subscriber (123) viewed a DVD 508. The merge processor (104) determines that the DVD was a science fiction DVD by extracting data from the subscriber-action database (112).

And according to FIGS. 3A and 3B, between 4:15 and 5:15, the subscriber (123) viewed national content and advertising, with the exception of the period between 5:15 and 5:30 during which the cable operator inserted a local advertisement segment in the content stream in place of the national content 510. By accessing the national-content database (114), the merge processor (104) determines that the national content viewed by the subscriber (123) was an NBA (National Basketball Association) basketball game.

An analyst evaluates the data shown in FIG. 5 to determine preferences and viewing habits of the subscriber (123). The analyst may be a computer program executing on a processor (not shown). The analyst also attempts to extrapolate the data in order to project purchase habits of the subscriber 123. In order to evaluate the data shown in FIG. 5, the analyst begins by assigning a category or genre to the programming. For example, during the period between 1:00 and 2:30, the subscriber 123 viewed a NCAA basketball game 506. An analyst would assign various types and levels of categories to the game, such as basketball, college athletics (type of program), college name, and conference. The analyst may also note that sometime between 2:15 and 2:30, a PGA golf tournament began, and the subscriber 123 started a DVD movie. This might indicate that the subscriber 123 did not enjoy watching golf on TV. During the same period, the subscriber 123 also watched several advertisements. The analyst categorizes these as well. The analyst repeats the process of categorization of programming and advertising for the remainder of the data 508, 510.

By categorizing content using multiple category types and multiple levels, the analyst is able to provide an abundance of information to programming and advertising producers, and providers, as well as to the product owners and manufacturers who pay to have the ads produced and distributed. Categorization in this manner also provides the analyst with multiple perspectives from which to analyze the data.

In addition, the analyst may look for patterns or correlations between multiple programs and advertisements or between categories of multiple programs and advertisements. In correlating data, the analyst is seeking causal, complementary, parallel, or reciprocal relations between various occurrences of data. For example, in FIG. 5, the subscriber 123 viewed a basketball game, a science fiction movie, and another basketball game. An analyst may correlate this data and find that the subscriber 123 generally watches primarily sports-related broadcasts, and otherwise watches content from video sources in the home. The analyst may also perform a probability analysis to determine the likelihood that a subscriber 123 will watch a particular category or genre of show if presented with the opportunity.

Although only a brief period of time is shown in the Figures, the subscriber content-choice database includes data recorded continually over many days. By analyzing various days and time periods, an analyst can determine a subscriber's time-of-day viewing patterns as well as the subscriber's patterns of viewing duration. For example, an analyst may determine whether the subscriber 123 tends to view the entirety of a program or of an advertisement.

Determining the duration of viewing of advertisements is important to advertisers. If a subscriber 123 initially views an entire advertisement but subsequently, views only a small portion of the advertisement, then the advertiser may need to reschedule the advertisement so that it runs less frequently, or replace the advertisement altogether. Also, if subscribers viewing a particular category of programming generally view ads in their entirety, but other viewers do not, the advertiser may want to focus resources on presenting the advertisement to these viewers.

Beyond analyzing ads in general, advertisers may also desire information related to specific ads or even of a competitor's ads. Using the information, the advertiser may be able to determine the relative strengths and weaknesses of the advertisers own strategy versus a competitor's strategy.

Various indirect methods may also be used to determine the popularity of programming and the effectiveness of advertising. For example, advertising effectiveness is often measured in terms of viewer attitudes and subsequent viewer actions, such as purchases, inquiries, behavior changes, and other actions. Method of obtaining these indirect measures include: focus group tests, post-advertising surveys questioning whether an advertisement was viewed, remembered and possible impact, and measures of product purchases or other indirect results that may indicate whether or not an advertising campaign has been successful. In an embodiment of the present invention, additional databases store the data derived through these indirect methods. The merge processor 104 combines this data with the data in the subscriber content-choice database 128 to provide additional information to analysts and content providers.

The exemplary embodiments may include an analyzer 131. The analyzer 131 is a computer which includes program code for analyzing data in the subscriber database 130. The analyzer 131 may create reports, including both summary and detailed information regarding subscribers' content choices. Content providers, such as a cable operator, use these reports for various purposes, including creating directly marketing campaigns, designing program offerings, pricing program offerings, creating incentive packages that will appeal to certain groups of subscribers, and creating offerings including content along with complementary products and/or services.

Figure 6:
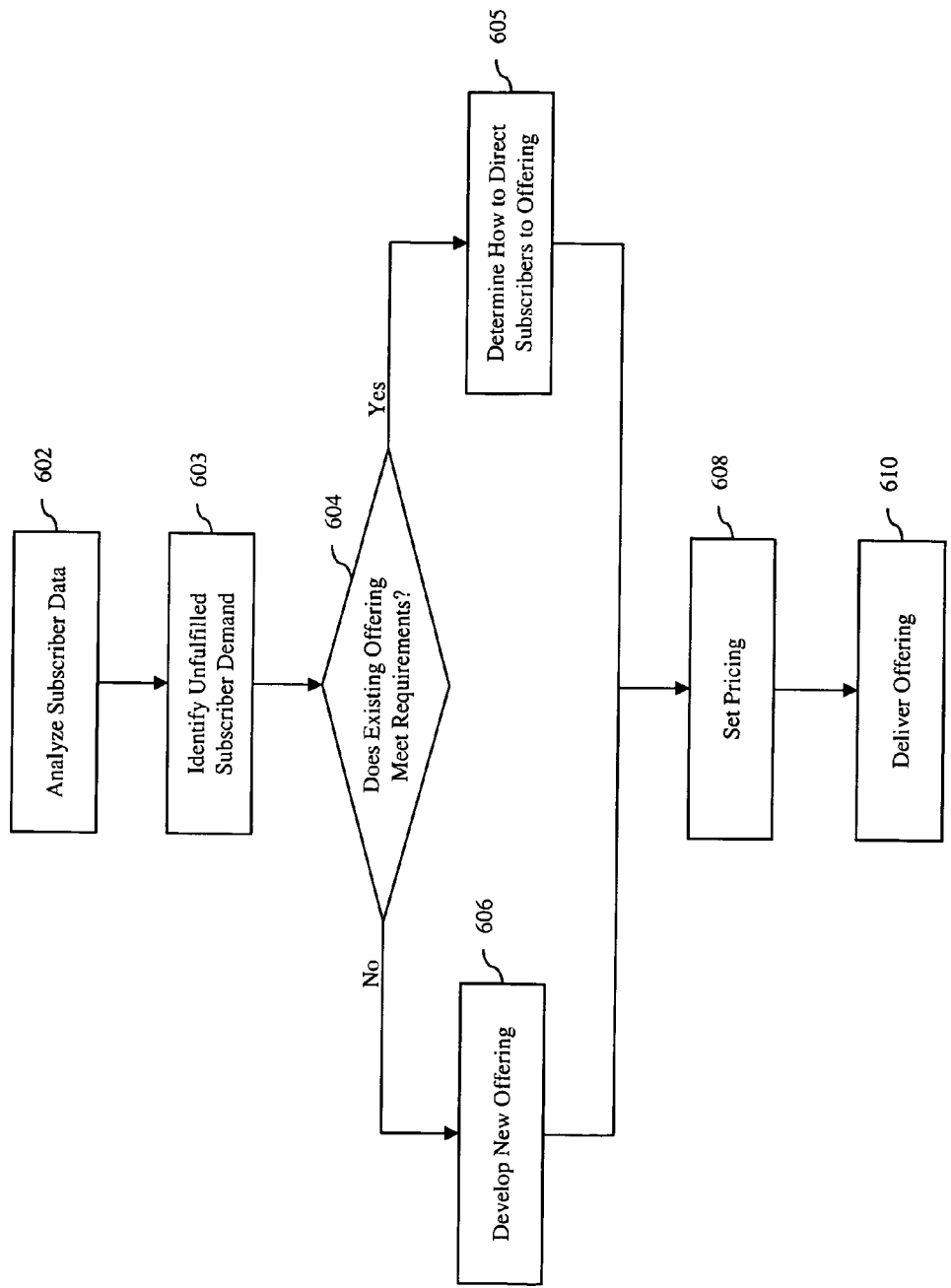
FIG. 6 is a flowchart illustrating a method of analyzing the data collected and combined in the subscriber database to formulate a new programming offering, according to exemplary embodiments.

FIG. 6 is a flowchart illustrating a method of analyzing the data collected and combined in the subscriber database 130 shown in FIG. 1 to formulate a new programming offering, according to exemplary embodiments. The content provider first uses the analyzer 131 to analyze data in the subscriber database (130) 602. For example, analyzer 131 generates a report, which details the viewing history of subscribers for Saturday afternoons from September until November. A cable provider reads the report and determines that a group of the cable operator's subscribers watch nothing but football between noon and midnight. In another embodiment, a datamining application executing on the analyzer 131 reaches the same conclusion.

Referring again to FIG. 6, based on the results of the analysis, the content provider attempts to identify any unfulfilled subscriber demand evident in the output from the analyzer 603. For example, in the case of the football fans, the cable provider may limit the subscribers' channel hopping behavior by offering an all-football channel. If the subscribers limit their channel-hopping, they may also be more likely to view the advertisements that the cable operator includes with the programming. Since the cable operator can also create reports that include advertisement viewing, the cable operator has the ability to demonstrate the decrease in channel hopping and increase in advertisement viewing to the advertisers.

Once the content provider has identified what is needed, the content provider determines whether or not an existing offering would fulfill the unmet demand 604. If the content provider has an offering meeting the unmet need, the subscriber determines how to direct the identified subscribers to the offering 605. For example, the cable operator may already offer an all-football-all-the-time channel. However, few subscribers are aware of the channel. The cable operator may direct advertising to the football fans, informing them that the all-football-all-the-time channel exists.

If an offering meeting the unmet demand does not already exist, the content provider develops a new offering 606. For example, if the cable operator does not have an all-football-all-the-time channel, the subscriber may create one by combining various national and local programming.

The content provider next sets the pricing for the existing or new offering 608. If the content provider has created a new offering, the price will likely be set higher than it would be for an existing offering because the cost in time and resources to develop the offering must be recouped. Also, the smaller the group for which an offering is tailored, the higher the price is likely to be because the cost of producing the offering is spread out among a small group of subscribers. For example, if the cable operator has an existing all-football-all-the-time channel, the cost of direct advertising to the football fans may be minimal compared to the increases in ratings and therefore advertising revenue derived from the advertising. However, if the cable operator purchases additional broadcasting rights in order to create the all-football-all-the-time channel, the cost will likely be passed on to subscribers who opt to subscribe to the channel.

Once the pricing is set, the provider delivers the content offering 610. The content provider may determine what an offering includes in various ways, including, for example, writing various options on paper or using a simple computer application, such as a spreadsheet. The offering may be created using a computer. For example, a computer program on analyzer 131 is able to analyze subscriber content-access histories to determine unfulfilled needs and creates content offerings specifically targeted to those needs.

At some point, the program must be made available to actual subscribers. For example, a cable operator loads the all-football-all-the-time channel offering on the content-distribution server 132 for delivery via the cable network 120.

A similar process may be implemented to bundle combinations of various content offerings or bundles that include content offerings and products and/or services. For example, a cable operator offering the all-football-all-the-time channel may partner with a travel agency to offer a bundle including travel to and accommodations in the city hosting the Super Bowl. The price for the bundle is set in a manner similar to the process used to price a simple content offering: a new bundle or a bundle directed to a small number of subscribers carries a higher price than an existing bundle or a bundle targeted at a large group of subscribers. For example, very few football fans are likely to attend the Super Bowl, to the price of the bundle is discounted only slightly from the normal cost of accessing the channel and traveling to the Super Bowl host city.

Figure 7:
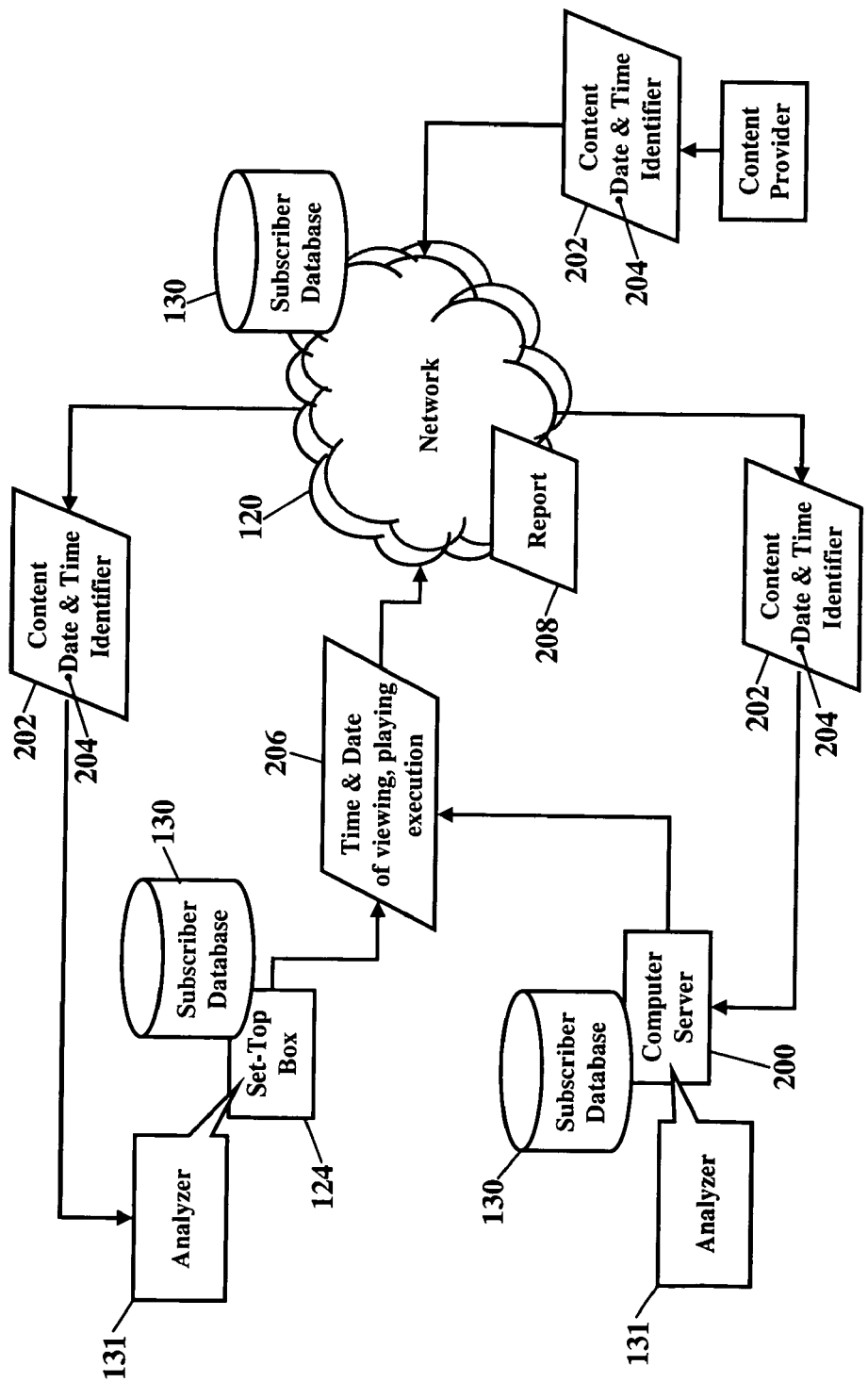
FIG. 7 is a schematic illustrating a method for accessing subscriber content access, according to more exemplary embodiments.

FIG. 7 is a schematic illustrating a method for assessing subscriber content access, according to more exemplary embodiments. As the above paragraphs explain, advertisers, marketers, and content providers may desire to know the strength of their strategies. If a subscriber initially views an entire advertisement, but, subsequently, only views a portion of the advertisement, then the advertiser may need to reschedule the advertisement or replace the advertisement altogether. If some subscribers viewing a particular category of programming generally view ads in their entirety, but other viewers do not, the advertiser may want to focus resources on presenting the advertisement to these favorable viewers. Moreover, advertisers may also determine the strengths of their advertisements in relation to competitor's ads, and the advertisers can adjust their strategies to counter the competitor's strategy.

FIG. 7, then, illustrates a method of reporting a subscriber's content access selections. FIG. 7 illustrates the analyzer 131 operating with a computer server 200, although, as previously explained, the analyzer 131 may additionally or alternatively operate within the set-top box 124. FIG. 7 also illustrates the subscriber database 130 being locally accessible to the computer server 200 and the set-top box 124, yet the subscriber database 130 may be remotely accessible via the network 120. As content 202 is provided to the subscriber via the network 120, the analyzer 131 stores a date and time identifier 204. The date and time identifier 204 indicates when the content 202 is provided to the subscriber. The content 202 may be provided by broadcast, multicast, and/or unicast, or other cable or Internet transmission. The set-top box 124 also communicates via the network 124 when the content is displayed 206. That is, the analyzer 131 receives the date and time that the content 202 is provided by a content provider, and the analyzer 131 stores and communicates the date and time that same content 202 is eventually displayed, played, or executed by the subscriber. The analyzer 131 thus stores in the subscriber database 130 when the content 202 is provided and when the content is viewed. The analyzer 131 then creates a report 208 indicating the date and time the content 202 is provided and the date and time when the content is viewed. The report 208 is communicated via the network 120 to any destination.

Figure 8:
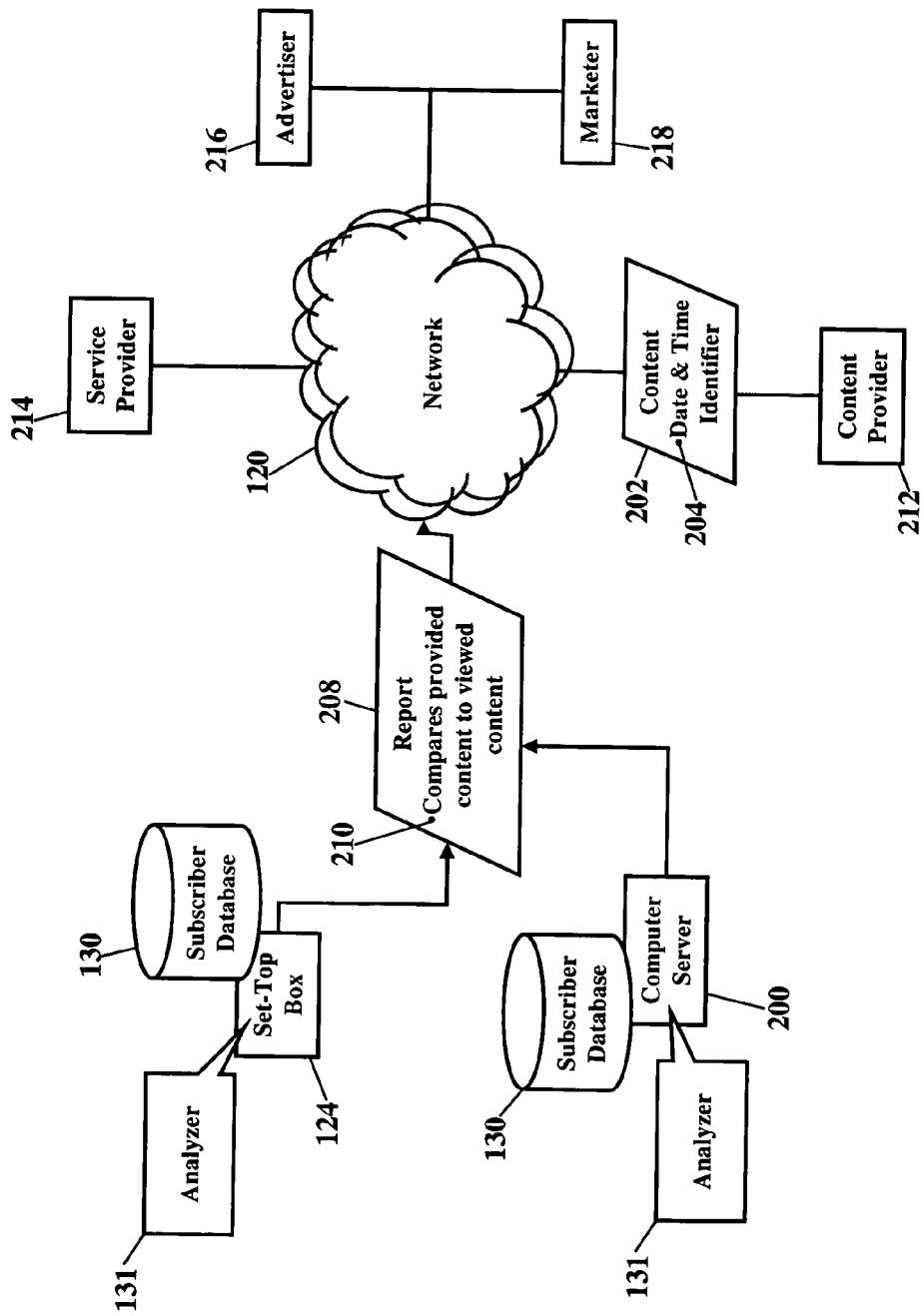
FIGS. 8-11 are schematics illustrating various reports created by an analyzer, according to more exemplary embodiments.

FIG. 8 is a schematic further illustrating the report 208, according to more exemplary embodiments. The analyzer 131 may create the report 208 and provide various types of information to advertisers, marketers, and content providers. The report 208, for example, may compare provided content to viewed content (shown as reference numeral 210). The analyzer 131, for example, may report when the subscriber views different content from that provided to the subscriber. The subscriber may decline to view content provided by the content provider and, instead, view an alternate source of content, such as a DVD, VCR, recorder, website, or other source of alternate content. The report 208 is provided via the network 124 to content providers 212, service providers 214, advertisers 216, and/or marketers 218. The report 208 thus soberly informs advertisers, marketers, and content provides that they failed to capture the subscriber's viewing preferences. Content providers may then decide to tailor their content offers to capture the interests of the subscriber.

Figure 9:
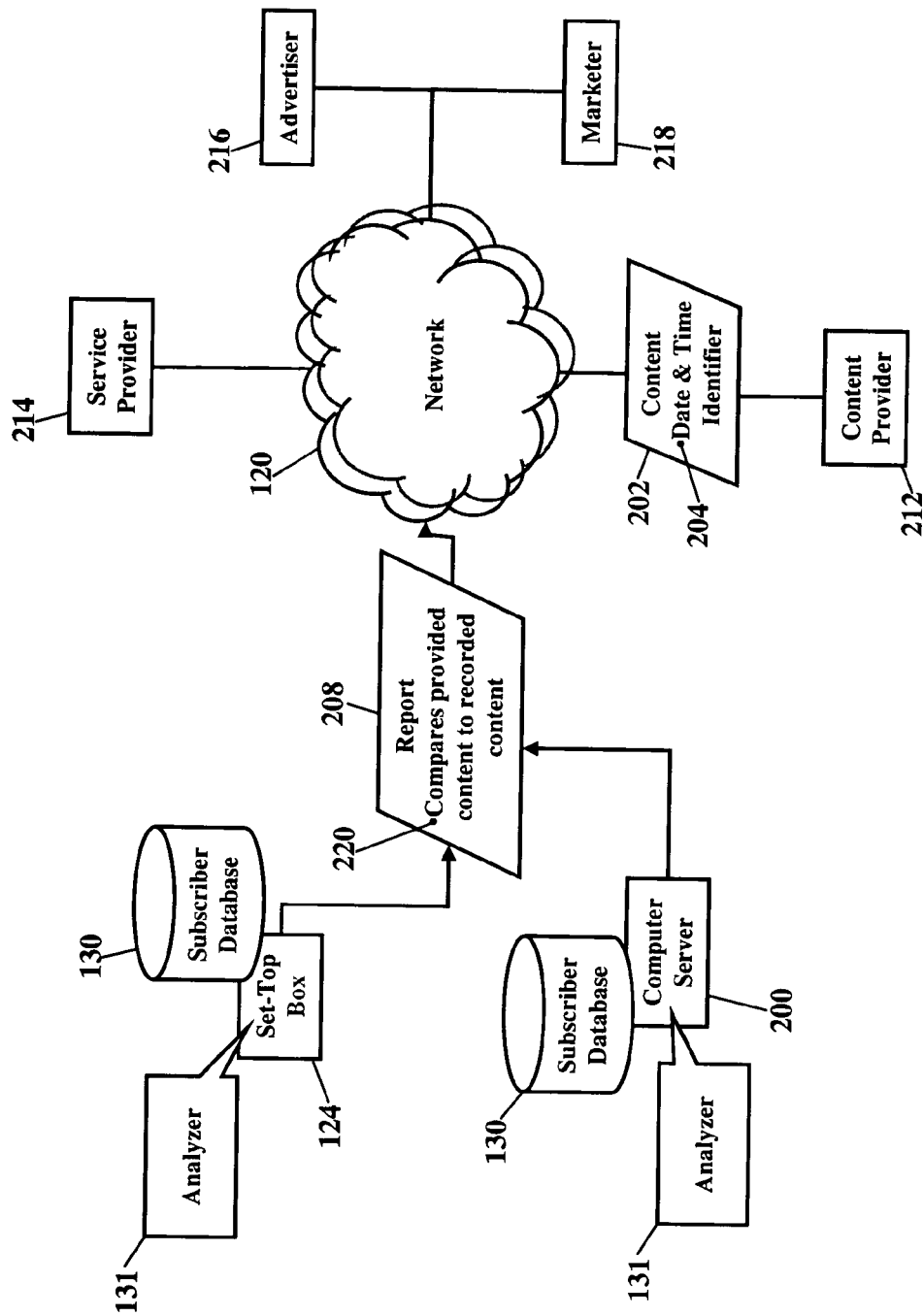

FIG. 9 is another schematic illustrating the report 208, according to yet more exemplary embodiments. Here the report 208 compares when content is recorded by the subscriber verses when that content was provided to the subscriber (shown as reference numeral 220). Here the set-top box 124 (or the computer server 200) communicates via the network 124 when the content 202 is recorded by a recorder, such as a VCR, DVD recorder, or other digital recorder. The set-top box 124 may additionally or alternatively communicate when the content 202 is locally or remotely saved to memory. The analyzer 131 then tailors the report 208 to compare the time of recording to the actual time of viewing.

The report 208 shown in FIG. 9 may be important to advertisers and content providers. The report 208 tracks and reports content that is viewed in real time (that is, when provided to the set-top box 124) verses content that was viewed in a time-shifted environment. If the subscriber views content at the provided time (e.g., the broadcast time), the advertiser and content provider is assured that the content meets the subscriber's desires. If the subscriber, however, views the provided content at a later time, then the subscriber is recording the content. Because the content is being recorded and viewed at a later time, it is probable that the subscriber skips advertisements during time-shifted viewing. Advertisers and content providers, then, may wish to know what percentage of subscribers view content at the time provided, verses what percentage of subscribers view the content at later times.

Figure 10:
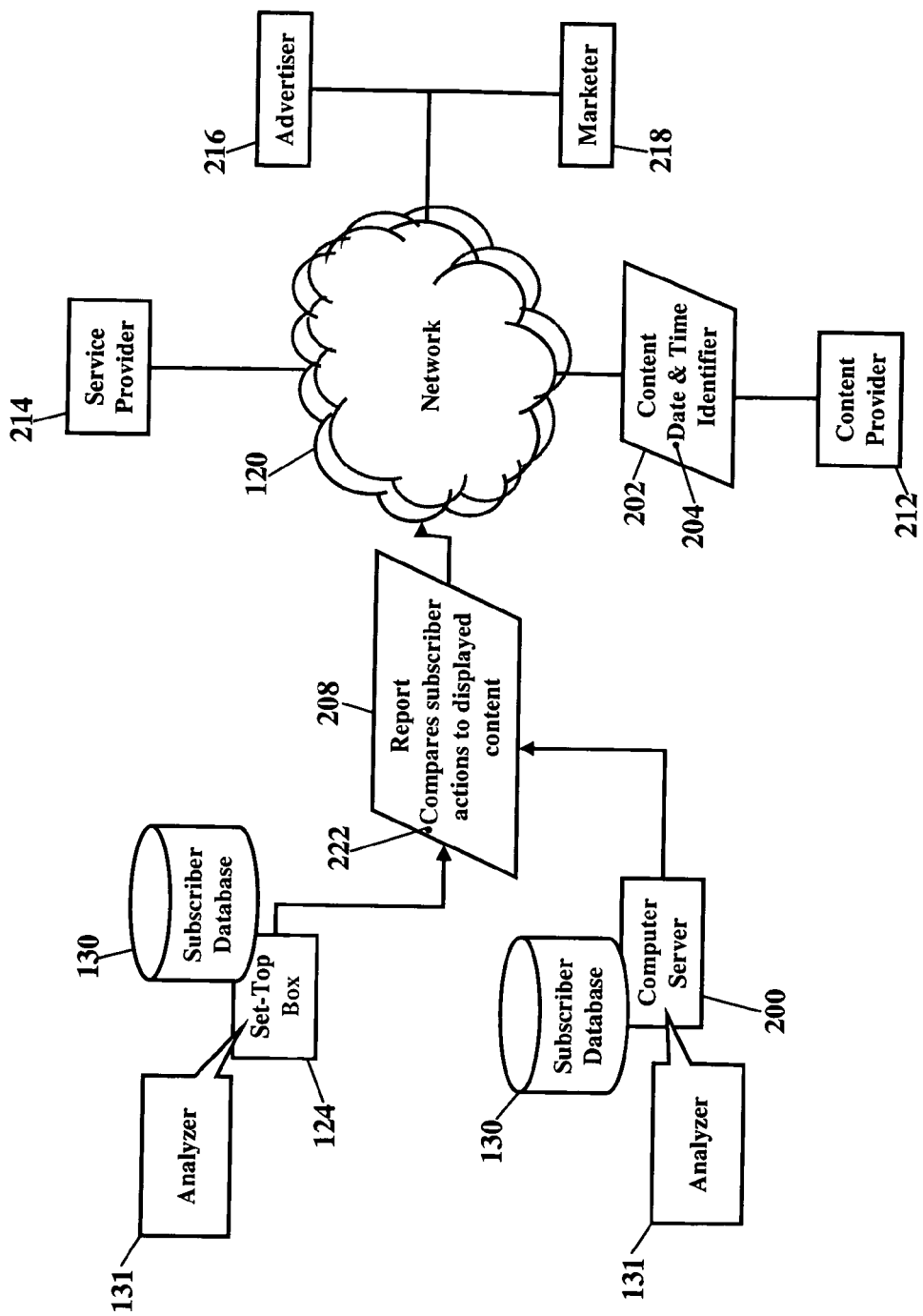

FIG. 10 is another schematic illustrating the report 208, according to still more exemplary embodiments. Here the report 208 compares the subscriber's actions with information describing the content that is displayed (shown as reference numeral 222). The analyzer 131, as earlier described, may merge information describing the subscriber's actions with information describing the content that is displayed, played, and/or executed. The subscriber's actions are stored in the subscriber-action database 130. The subscriber-action database 130 stores each action taken by the subscriber, such as "channel up" and "channel down" inputs or events, with a date-time stamp. The report 208 may additionally or alternatively describe the actions the subscriber took to view particular content.

Figure 11:
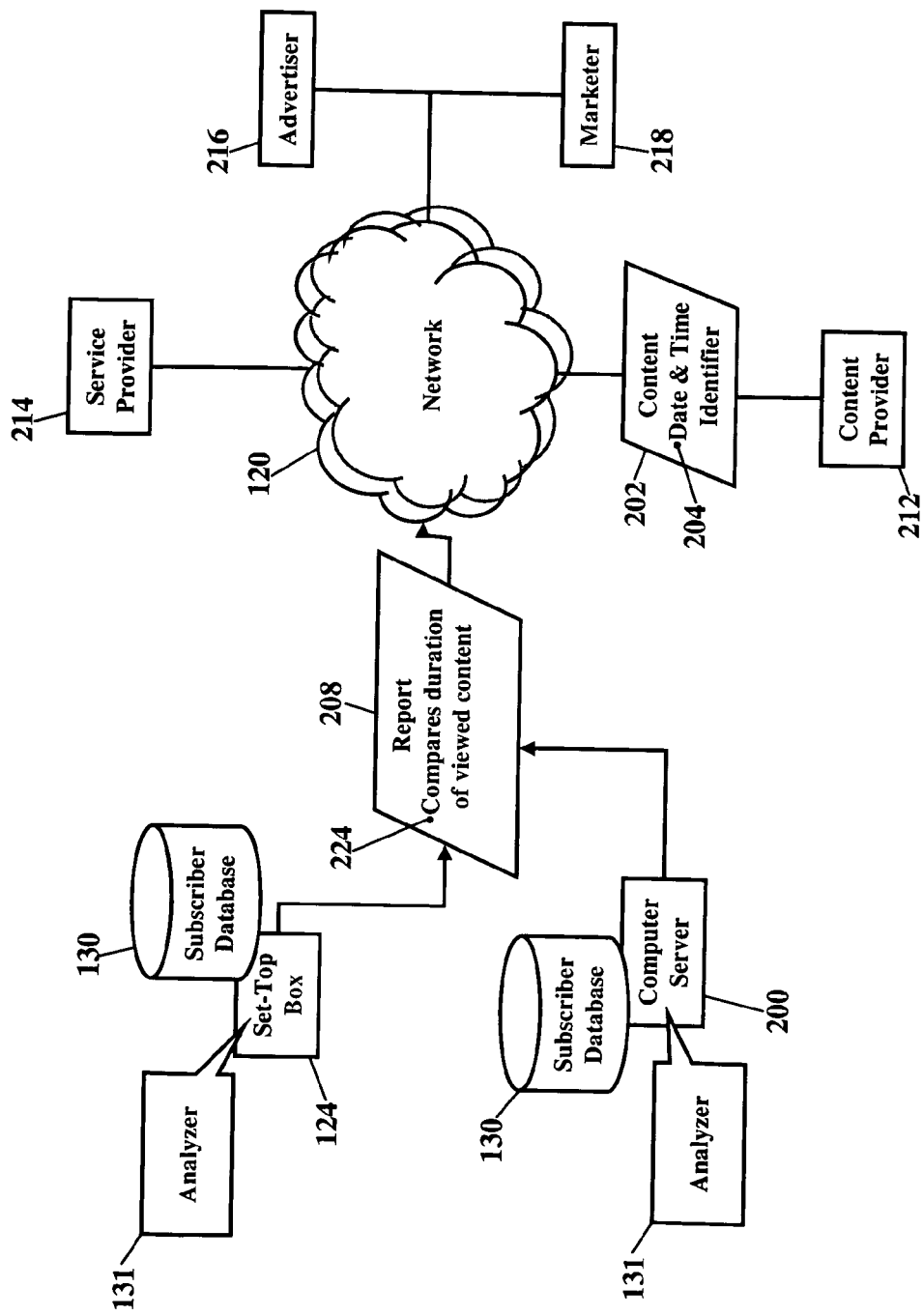

FIG. 11 is another schematic illustrating the report 208, according to even more exemplary embodiments. Here the report 208 includes the duration of time the content was viewed (shown as reference numeral 224). The analyzer 131 determines what length of time the subscriber listens to, views, or otherwise experiences a particular content offering. The analyzer 131 may also determine the duration of time alternate content from an alternate source was selected, played, and/or viewed. Programming, advertisements, or other content choices that are quickly viewed (or not at all) are not engaging the subscriber. Consequently, the tailored content is failing and the analyzer 131 needs calibration. (Or perhaps the tailored content just needs to be better—some poor quality, offensive, or insulting commercials may drive the subscriber to change channels or content.) Moreover, advertisers may quickly determine the success, or failure, of an ad campaign that targets a demographic. The report 208, again, soberly informs advertisers, marketers, and content provides whether they succeeded or failed in their attempt to capture the subscriber's viewing preferences.

FIG. 12 is a flowchart illustrating a method for reporting a subscriber's content access selections, according to still more exemplary embodiments. Information is stored that describes when content is provided to a subscriber (Block 300). The information may include a date and time identifier (Block 302). Information is also stored describing when that content is displayed by the subscriber (Block 304). A report is created that describes when the content is provided and when the content is viewed (Block 306). Which content is viewed by the subscriber may be compared to what content is provided to the subscriber (Block 308). Viewing of content from an alternate source may also be compared to content provided to the subscriber (Block 310). When content is recorded may be compared to the date and time the content was provided (Block 312). Information describing the subscriber's actions may be merged and reported with information describing the content that is displayed (Block 314). A duration of time that the subscriber views the content may also be determined (Block 316).

The exemplary embodiments have been presented only for the purpose of illustration and description and are not intended to be exhaustive or to limit the exemplary embodiments to the precise forms disclosed. Numerous modifications and adaptations thereof will be apparent to those skilled in the art without departing from the spirit and scope of the exemplary embodiments.

What is claimed is:

1. A method for reporting a subscriber's content access selections, comprising:

storing a date and time when content is delivered to a subscriber's device;

storing channel numbers associated with subscriber events describing commands entered as the subscriber views the content;

comparing a channel number associated with a subscriber event to a table that associates channel numbers to channel identifiers;

retrieving a channel identification code associated with a network;

uploading the channel identification code and the subscriber event to a network server in the network;

merging, by the network server, content metadata with the channel identification code and the subscriber event to describe the subscriber's content access selections; and comparing the date and time to the subscriber's content access selections to determine when the content was displayed by the subscriber's device.

2. A method according to claim 1, further comprising determining a date and time identifier indicating when the content was displayed.

3. A method according to claim 1, further comprising determining a time between delivery and display.

4. A method according to claim 1, further comprising comparing the content delivered to the subscriber's device to alternate content viewed by the subscriber from an alternate source.

5. A method according to claim 1, further comprising comparing the content delivered to the subscriber's device to recorded content that is recorded by the subscriber.

6. A method according to claim 1, further comprising applying priority assignments to the content metadata such that metadata from an electronic programming guide has a lowest priority.

7. A method according to claim 1, further comprising projecting purchasing habits from the subscriber's content access selections.

8. A system, comprising:

a processor executing instructions stored in memory that cause the processor to:

store a date and time when content is delivered to a subscriber's device;

store channel numbers associated with subscriber events describing commands entered as the subscriber views the content;

compare a channel number associated with a subscriber event to a table that associates channel numbers to channel identifiers;

retrieve a channel identification code associated with the channel number;

upload the channel identification code and the subscriber event to a network server in a network;

merge, by the network server, content metadata with the channel identification code and the subscriber event to describe the subscriber's content access selections; and compare the date and time to the subscriber's content access selections to determine when the content was displayed by the subscriber's device.

9. A system according to claim 8, wherein the instructions further cause the processor to report a date and time identifier that the content was broadcast to the subscriber's device.

10. A system according to claim 8, wherein the instructions further cause the processor to compare a first date and time identifier to a second date and time identifier to determine a time between delivery and display.

11. A system according to claim 8, wherein the instructions further cause the processor to compare the content delivered to the subscriber's device to alternate content viewed by the subscriber from an alternate source.

12. A system according to claim 8, wherein the instructions further cause the processor to compare a first date and time identifier to a time that recorded content is recorded by the subscriber to yield a comparison of a time of recording to an actual time of viewing.

13. A system according to claim 8, wherein the instructions further cause the processor to compare a first date and time identifier to a time that the content is stored to the memory to yield a comparison of a time of recording to an actual time of viewing.

14. A system according to claim 8, wherein the instructions further cause the processor to project purchasing habits from the subscriber's content access selections.

15. A computer program product comprising a non-transitory computer readable storage medium storing processor executable instructions for performing a method, the method comprising:

receiving a first date and time identifier that indicates when content is delivered to at least one subscriber's device;

storing channel numbers associated with subscriber events describing commands entered as the subscriber views the content;

comparing a channel number associated with a subscriber event to a table that associates channel numbers to channel identifiers;

retrieving a channel identification code associated with the channel number;

uploading the channel identification code and the subscriber event to a network server in a network;

uploading the first date and time identifier to the network server;

merging, by the network server, content metadata with the channel identification code and the subscriber event to describe the subscriber's content access selections;

applying priority assignments to the content metadata such that metadata from an electronic programming guide has a lower priority than national ad metadata and local ad insert metadata has a higher priority than the national ad metadata; and comparing the first date and time identifier to the subscriber's content access selections to determine when the content was displayed by the subscriber's device.

16. A computer program product according to claim 15, further comprising computer code for storing a date and time that the content was broadcast to the subscriber's device.

17. A computer program product according to claim 15, further comprising computer code for comparing the first date and time identifier to a second date and time identifier to determine a time between delivery and display.

18. A computer program product according to claim 15, further comprising computer code for comparing the content delivered to the subscriber's device to alternate content viewed by the subscriber from an alternate source.

19. A computer program product according to claim 15, further comprising computer code for comparing the first date and time identifier to a time that recorded content is recorded by the subscriber to yield a comparison of a time of recording to an actual time of viewing.

20. A computer program product according to claim 15, further comprising computer code for projecting purchasing habits from the subscriber's content access selections.

* * * * *